(12) United States Patent
Yamagishi

(10) Patent No.: US 10,769,211 B2
(45) Date of Patent: *Sep. 8, 2020

(54) INFORMATION PROCESSING DEVICE AND INFORMATION PROCESSING METHOD

(71) Applicant: SATURN LICENSING LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,120

(22) Filed: May 18, 2018

(65) Prior Publication Data

US 2019/0026390 A1 Jan. 24, 2019

Related U.S. Application Data

(63) Continuation of application No. 13/894,779, filed on May 15, 2013, now Pat. No. 10,002,206.
(Continued)

(51) Int. Cl.
*G06F 16/903* (2019.01)
*H04N 21/2668* (2011.01)
(Continued)

(52) U.S. Cl.
CPC ... *G06F 16/90335* (2019.01); *H04N 21/2668* (2013.01); *H04N 21/4431* (2013.01);
(Continued)

(58) Field of Classification Search
CPC ........................ G06F 16/90335; G06F 16/9035
See application file for complete search history.

(56) References Cited

U.S. PATENT DOCUMENTS 8,190,605 B2* 5/2012 Kuhlke ................... G06F 16/70
707/732
2002/0100045 A1* 7/2002 Rafey .................. H04N 5/4401
725/46
(Continued)

FOREIGN PATENT DOCUMENTS

CN   1653819       8/2005
CN   1799262 A     7/2006
(Continued)

OTHER PUBLICATIONS

Office Action dated Mar. 29, 2018 in Chinese Patent Application No. 201380054461.0 (With English Translation).
(Continued)

*Primary Examiner* — Richard L Bowen
(74) *Attorney, Agent, or Firm* — Oblon, McClelland, Maier & Neustadt, L.L.P.

(57) ABSTRACT

An information processing device for obtaining content is provided. The information processing device includes circuitry configured to receive audio/video (AV) content via a broadcast signal. The circuitry is configured to receive from a provider of the AV content, provider-side preference, demographic or interest (PDI) information. The provider-side PDI information is associated with further content. The circuitry is configured to obtain user-side PDI information, and determine whether the provider-side PDI information and the user-side PDI information match. The circuitry is configured to obtain the further content when the provider-side PDI information and the user-side PDI information are determined to match, including calling at least one application programming interface (API).

19 Claims, 36 Drawing Sheets

Related U.S. Application Data

(60) Provisional application No. 61/719,041, filed on Oct. 26, 2012.

(51) Int. Cl.
  *H04N 21/443* (2011.01)
  *H04N 21/454* (2011.01)
  *H04N 21/458* (2011.01)
  *H04N 21/475* (2011.01)

(52) U.S. Cl.
  CPC ......... *H04N 21/454* (2013.01); *H04N 21/458* (2013.01); *H04N 21/4755* (2013.01); *H04N 21/4758* (2013.01)

(56) References Cited

U.S. PATENT DOCUMENTS

| | | |
|---|---|---|
| 2003/0037139 A1 | 2/2003 | Shteyn |
| 2003/0195863 A1* | 10/2003 | Marsh ............... G11B 27/322 |
| 2007/0038931 A1 | 2/2007 | Allaire et al. |
| 2007/0094705 A1* | 4/2007 | Crowley ............ H04N 7/17318 725/136 |
| 2007/0204004 A1 | 8/2007 | Coyer et al. |
| 2008/0141308 A1 | 6/2008 | Yoon et al. |
| 2008/0294603 A1 | 11/2008 | Ranjan et al. |
| 2009/0178081 A1* | 7/2009 | Goldenberg ......... G06F 3/0482 725/46 |
| 2010/0088359 A1 | 4/2010 | Phillips et al. |
| 2010/0138517 A1 | 6/2010 | De Los Reyes et al. |
| 2010/0192175 A1 | 7/2010 | Bachet et al. |
| 2010/0257553 A1* | 10/2010 | Yuen .................. G06Q 30/02 725/36 |
| 2010/0306048 A1 | 12/2010 | Corduneanu et al. |
| 2011/0075990 A1 | 3/2011 | Eyer |
| 2011/0088075 A1 | 4/2011 | Eyer |
| 2011/0113041 A1 | 5/2011 | Hawthorne et al. |
| 2011/0185384 A1 | 7/2011 | Wang et al. |
| 2011/0243536 A1 | 10/2011 | Eyer |
| 2011/0246488 A1 | 10/2011 | Eyer |
| 2011/0247028 A1 | 10/2011 | Eyer |
| 2011/0258192 A1 | 10/2011 | Yao et al. |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0066018 A1 | 3/2012 | Piersol |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0128065 A1 | 5/2012 | Shibahara et al. |
| 2012/0185888 A1 | 7/2012 | Eyer et al. |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2013/0024894 A1 | 1/2013 | Eyer |
| 2013/0024897 A1 | 1/2013 | Eyer |
| 2013/0031569 A1 | 1/2013 | Eyer |
| 2013/0036440 A1 | 2/2013 | Eyer |
| 2013/0055313 A1 | 2/2013 | Eyer |
| 2013/0103716 A1 | 4/2013 | Yamagishi |
| 2014/0075316 A1* | 3/2014 | Li .................. G06F 16/435 715/719 |

FOREIGN PATENT DOCUMENTS

| | | |
|---|---|---|
| CN | 19188214 A | 2/2007 |
| CN | 101116336 | 1/2008 |
| JP | 2002-528971 A | 9/2002 |
| JP | 2003-101893 A | 4/2003 |
| JP | 2005-130196 A | 5/2005 |
| JP | 2005-525755 A | 8/2005 |
| JP | 2009-519624 A | 5/2009 |
| JP | 2010-021988 | 1/2010 |

OTHER PUBLICATIONS

Combined Chinese Office Action dated Aug. 14, 2017 in Patent Application No. 201380054461.0 (with English language translation).

Supplementary European Search Report dated May 17, 2016 in European Patent Application No. EP 13 84 9308.

Kitazato et al., "A Revolutionary Digital Broadcasting System: Achieving Maximum Possible Use of Bandwidth," DVB, Digital Video Broadcasting, Oct. 20, 2011 (31 pp) XP17846902.

"Final Report on ATSC 3.0 Next Generation Broadcast Television: ATSC Planning Team 2," Advanced Television Systems Committee, Sep. 21, 2011 (40 pp), XP17846916.

Chernock, "ATSC 2.0: What's Next?: ATSC Bootcamp," Triveni Digital; ATSC: The Future of TV, Oct. 24, 2011, (38 pp), XP17846737.

International Search Report dated Jan. 21, 2014 in PCT/JP2013/078039 (with English language translation).

\* cited by examiner

FIG.6

```xml
 1: <xs:schema xmlns:xs="http://www.w3.org/2001/XMLSchema" elementFormDefault="qualified" attributeFormDefault="unqualified">
 2:     <xs:element name="PDItable" type="PDItableType"/>
 3:     <xs:complexType name="PDItableType">
 4:         <xs:choice maxOccurs="unbounded">
 5:             <xs:element name="QIA" type="IntegerAnswerType"/>
 6:             <xs:element name="QBA" type="BooleanAnswerType"/>
 7:             <xs:element name="QSA" type="SelectionAnswerType"/>
 8:             <xs:element name="QTA" type="TextAnswerType"/>
 9:             <xs:element name="QAA" type="AnyAnswerType"/>
10:         </xs:choice>
11:         <xs:attribute name="transactional" type="xs:boolean" use="optional"/>
12:     </xs:complexType>
13:     <xs:complexType name="IntegerAnswerType">
14:         <xs:sequence>
15:             <xs:element name ="id" type ="xs:anyURI"/>
16:             <xs:element name="q" type="xs:string" minOccurs="0"/>
17:             <xs:element name="a" type="xs:integer" minOccurs="0"/>
18:         </xs:sequence>
19:         <xs:attribute name="minInclusive" type="xs:integer" use="optional"/>
20:         <xs:attribute name="maxInclusive" type="xs:integer" use="optional"/>
21:     </xs:complexType>
22:     <xs:complexType name="BooleanAnswerType">
23:         <xs:sequence>
24:             <xs:element name="id" type="xs:anyURI"/>
25:             <xs:element name="q" type="xs:string" minOccurs="0"/>
26:             <xs:element name="a" type="xs:boolean" minOccurs="0"/>
27:         </xs:sequence>
28:     </xs:complexType>
29:     <xs:complexType name="SelectionAnswerType">
30:         <xs:sequence>
31:             <xs:element name="id" type="xs:anyURI"/>
32:             <xs:element name="q" type="xs:string" minOccurs="0"/>
33:             <xs:element name="a" type="xs:string" minOccurs="0" maxOccurs="unbounded"/>
34:         </xs:sequence>
35:         <xs:attribute name="minChoice" type="xs:integer" use="optional"/>
36:         <xs:attribute name="maxChoice" type="xs:integer" use="optional"/>
37:     </xs:complexType>
38:     <xs:complexType name="TextAnswerType">
39:         <xs:sequence>
40:             <xs:element name="id" type="xs:anyURI"/>
41:             <xs:element name="q" type="xs:string" minOccurs="0"/>
42:             <xs:element name="a" type="xs:string" minOccurs="0"/>
43:         </xs:sequence>
44:     </xs:complexType>
45: </xs:schema>
```

FIG. 7

```
 1 : <PDItable transactional="true" >
 2 :     <QBA>
 3 :         <id>Common:111</id>
 4 :         <q>Are you currently employed?</q>
 5 :     </QBA>
 6 :     <QIA minInclusive="10" maxInclusive="100">
 7 :         <id>Common:222</id>
 8 :         <q>What is the age of the oldest member of the household who watches television?</q>
 9 :     </QIA>
10 :     <QSA minChoice="1" maxChoice="3">
11 :         <id>ProviderA:123</id>
12 :         <q>In which of the following sports are you most interested? (Multiple selection allowed)</q>
13 :         <a>Baseball</a>
14 :         <a>Basketball</a>
15 :         <a>Soccer</a>
16 :         <a>Hockey</a>
17 :     </QSA>
18 :     <QSA maxChoice="1">
19 :         <id>ProviderA:ProgramX:123</id>
20 :         <q>Do you enjoy camping and outdoor recreation?(Only one selection)</q>
21 :         <a>Never</a>
22 :         <a>Occasionally</a>
23 :         <a>Frequently</a>
24 :     </QSA>
25 :     <QTA>
26 :         <id>ProviderA:321</id>
27 :         <q> Who's products are you most interested in recently? </q>
28 :     </QTA>
29 : </PDItable>
```

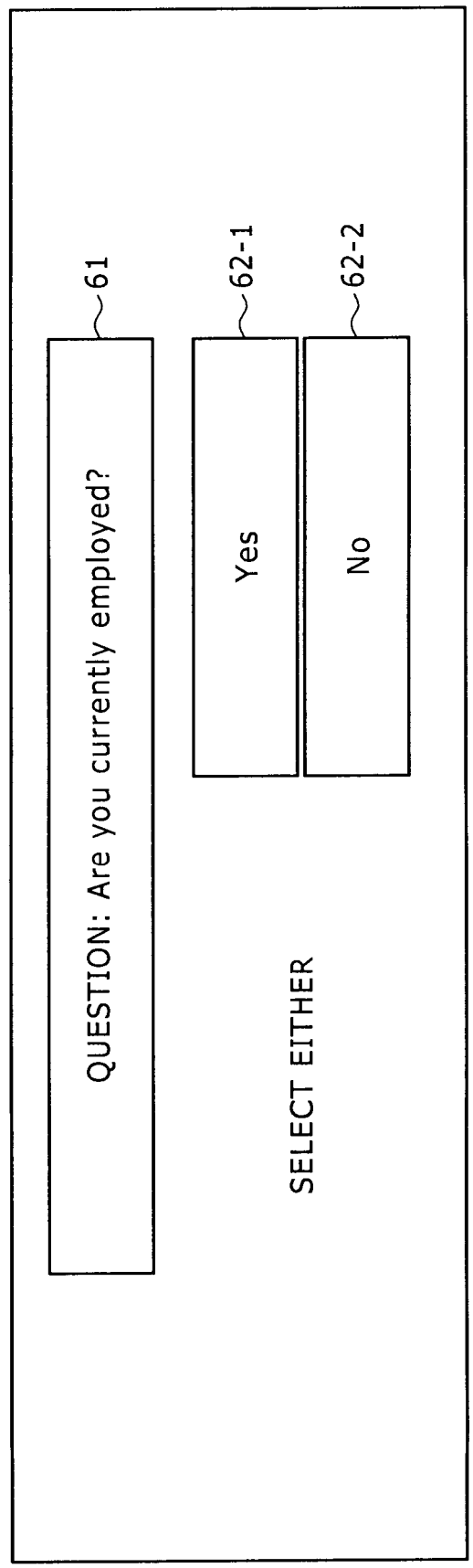

FIG. 10

QUESTION: In which of the following sports are you most interested?(Multiple selection allowed) ~81

82-1 Baseball
82-2 Basketball
82-3 Soccer
82-4 Hockey

SELECT ONE TO THREE
OF THE FOLLOWING

FIG.11

QUESTION: Do you enjoy camping and outdoor recreation?(Only one selection) ~91

92-1 Never
92-2 Occasionally
93-3 Frequently

SELECT ONLY ONE
OF THE FOLLOWING

FIG. 13

```
 1: <PDItable >
 2:     <QBA>
 3:         <id>Common:111</id>
 4:         <a>true</a>
 5:     </QBA>
 6:     <QIA>
 7:         <id>Common:222</id>
 8:         <a>34</a>
 9:     </QIA>
10:     <QSA>
11:         <id>ProviderA:123</id>
12:         <a>Baseball</a>
13:         <a>Soccer</a>
14:         <a>Hockey</a>
15:     </QSA>
16:     <QSA>
17:         <id>ProviderA:ProgramX:123</id>
18:         <a>Occasionally</a>
19:     </QSA>
20:     <QTA>
21:         <id>ProviderA:321</id>
22:         <a>Somy</a>
23:     </QTA>
24: </PDItable>
```

FIG. 14

```
 1 : <PDItable>
 2 :   <QBA>
 3 :     <id>Common:111</id>
 4 :     <a>false</a>
 5 :   </QBA>
 6 :   <QSA>
 7 :     <id>ProviderA:123</id>
 8 :     <a>Baseball</a>
 9 :   </QSA>
10 :   <QSA>
11 :     <id>ProviderA:ProgramX:123</id>
12 :     <a>Never</a>
13 :   </QSA>
14 : </PDItable>
```

FIG.15

```
1 : <PDItable>
2 :   <QSA>
3 :     <id>ProviderA:123</id>
4 :     <a>Basketball</a>
5 :   </QSA>
6 :   <QSA>
7 :     <id>ProviderA:ProgramX:123</id>
8 :     <a>Never</a>
9 :   </QSA>
10: </PDItable>
```

FIG.29

```
Service
    id
    version
    validFrom
    validTo
    gloalServiceID
    weight
    baseCID
    ServiceType
    Name
    Description
    AudioLanguage
        languageSDPTag
    TextLanguage
        languageSDPTag
    ParentalRating
        ratingSystem
        ratingValueName
    Genre
    Extesion
        url
        Description
    PreviewDataReterence
        idRef
        usage
    PrivateExt
        PDI-FC
```

FIG.30

```
Schedule
    id
    version
    defaultSchedule
    onDemand
    validFrom
    validTo
    ServiceRefence
        idRef
    ContentReference
        idRef
        contentLocation
        PresentationWindow
            startTime
            endTime
    PrivateExt
        PDI-FC
```

FIG.31

```
Content
    id
    version
    validFrom
    validTo
    gloalCotentID
    baseCID
    ServiceReference
        idRef
        weight
    Name
    Description
    StartTime
    EndTime
    AudioLanguage
        languageSDPTag
    TextLanguage
        languageSDPTag
    Length
    ParentalRating
        ratingSystem
        ratingValueName
    Genre
    Extension
        url
        Description
    PrevewDataReference
        idRef
        usage
    PrivateExt
        PDI-FC
```

FIG. 36

| Syntax | No. of bits | Format |
|---|---|---|
| PDI_descriptor() { | | |
| descriptor_tag | 8 | 0x(TBD) |
| descriptor_length | 8 | uimsbf |
| length | 8 | uimsbf |
| PDI_Q or PDI_A or PDI_A_Query | var | - |
| } | | | ured
INFORMATION PROCESSING DEVICE AND INFORMATION PROCESSING METHOD

CROSS-REFERENCE TO RELATED APPLICATION

This application is a continuation of U.S. Ser. No. 13/894,779 filed May 15, 2013, which claims the benefit of priority of Provisional Application Ser. No. 61/719,041, filed Oct. 26, 2012, the entire contents of which is incorporated herein by reference.

BACKGROUND

The present technology relates to an information processing device and an information processing method, and particularly to an information processing device and an information processing method that can obtain contents according to metadata.

Recently, with the digitization of television broadcasting, an amount of information that can be broadcast simultaneously has been increased dramatically. Accordingly, various kinds of data are simultaneously broadcast together with television programs (contents) to be viewed in real time.

In addition, a content download service has been proposed which uses the above-described television broadcasting and the Internet, which allows high-speed download of data, as different paths for content communication (see Japanese Patent Laid-Open No. 2010-21988, for example).

In an ordinary content download service, filtering attributes (referred to also as filtering indexes, filtering metadata, or the like) set in a server on the side of a provider (a content provider or a service provider) providing (distributing) contents are attached as metadata to contents so that a client for receiving (obtaining) the contents filters (selects) the contents.

The filtering attributes are set as values for metadata elements selected from a metadata set defined by an standardization organization such as ATSC (Advanced Television Standard Committee), ARIB (Association of Radio Industries and Businesses), or the like.

Specifically, for example, contents to which a filtering attribute is attached such that "viewing target" is selected as a metadata element and "teens" is set as a value for the metadata element are provided to a client that performs filtering so as to obtain "contents targeted at viewers 'in teens as a viewing target.'"

SUMMARY

However, metadata (filtering attributes) not included in the metadata set defined by the standardization organization is not attached to contents.

For example, even in a case where the provider side desires to distribute "contents targeted at viewers 'in teens as a viewing target' and 'interested in job hunting,'" when the metadata set defined by the standardization organization does not include "interest in job hunting" as a metadata element, a filtering attribute having "interested in job hunting" set as a metadata element cannot be attached to contents.

Therefore, on the side of the provider, contents to which an interest of viewers according to needs at a given time (for example in consideration of a fashion) is attached as metadata cannot be distributed.

In addition, in such a case, on the side of a client, filtering cannot be performed so as to obtain the contents according to the needs at the given time.

The present technology has been made in view of such a situation, and is to enable contents according to needs at a given time to be obtained.

An information processing device according to a first mode of the present technology is an information processing device for obtaining contents distributed from a server, the information processing device including: an answer generating section configured to generate user side answer information as information indicating an answer of a user to a question about a preference of the user so as to correspond to question information as information indicating the question, the question information being transmitted from the server; and a matching section configured to obtain the contents distributed from the server by performing matching between the user side answer information and provider side answer information as information indicating an answer set to the question by a provider providing the contents, the provider side answer information being transmitted from the server; wherein the matching section is provided as a Web application, and performs the matching between the user side answer information and the provider side answer information by calling a plurality of APIs (Application Programming Interfaces).

The information processing device can further include a storage section configured to store the user side answer information generated by the answer generating section, wherein the matching section can perform the matching between the user side answer information stored in the storage section and the provider side answer information by calling the plurality of APIs.

The matching section can call a user side answer information obtaining API for obtaining the user side answer information from the storage section.

The matching section can call a provider side answer information obtaining API for obtaining the provider side answer information from the server.

When the storage section is configured as a database, the matching section can call the user side answer information evaluating API for evaluating whether the user side answer information corresponding to the provider side answer information is stored in the storage section, and the matching section can obtain the contents corresponding to the provider side answer information for which an evaluation result is true.

The matching section can call a content obtaining API for obtaining the contents using a result of the matching.

The matching section can obtain the contents distributed from the server by performing matching between the user side answer information and a query indicating a combination of answers set by the provider, the query being transmitted from the server.

The matching section can call a query obtaining API for obtaining the query from the server.

When the storage section is configured as a database, the matching section can call the user side answer information evaluating API for evaluating whether the user side answer information corresponding to the query is stored in the storage section, and the matching section can obtain the contents corresponding to the query for which an evaluation result is true.

An information processing method according to the first mode of the present technology is an information processing method of an information processing device for obtaining contents distributed from a server, the information processing method including: an answer generating step of generating user side answer information as information indicating an answer of a user to a question about a preference of the user so as to correspond to question information as information indicating the question, the question information being transmitted from the server; and a matching step of obtaining the contents distributed from the server by performing matching between the user side answer information and provider side answer information as information indicating an answer set to the question by a provider providing the contents, the provider side answer information being transmitted from the server; wherein the matching step performs the matching between the user side answer information and the provider side answer information by calling a plurality of APIs (Application Programming Interfaces) on a Web application.

In the first mode of the present technology, user side answer information as information indicating an answer of a user to a question about a preference of the user is generated so as to correspond to question information as information indicating the question, the question information being transmitted from a server, and the contents distributed from the server are obtained by performing matching between the user side answer information and provider side answer information as information indicating an answer set to the question by a provider providing the contents, the provider side answer information being transmitted from the server. The matching between the user side answer information and the provider side answer information is performed by calling a plurality of APIs.

An information processing device according to a second mode of the present technology is an information processing device for obtaining contents distributed from a server, the information processing device including: a query generating section configured to generate a query indicating a combination of answers of a user to questions about preferences of the user so as to correspond to question information as information indicating the questions, the question information being transmitted from the server; and a matching section configured to obtain the contents distributed from the server by performing matching between the query and provider side answer information as information indicating answers set to the questions by a provider providing the contents, the provider side answer information being transmitted from the server; wherein the matching section is provided as a Web application, and performs the matching between the query and the provider side answer information by calling a plurality of APIs (Application Programming Interfaces).

The information processing device can further include a storage section configured to store the query generated by the query generating section, wherein the matching section can perform the matching between the query stored in the storage section and the provider side answer information by calling the plurality of APIs.

The matching section can call a query obtaining API for obtaining the query from the storage section.

The matching section can call a provider side answer information obtaining API for obtaining the provider side answer information from the server.

When the storage section is configured as a database, the matching section can call the query evaluating API for evaluating whether the query corresponding to the provider side answer information is stored in the storage section, and the matching section can obtain the contents corresponding to the provider side answer information for which an evaluation result is true.

The matching section can call a content obtaining API for obtaining the contents using a result of the matching.

An information processing method according to the second mode of the present technology is an information processing method of an information processing device for obtaining contents distributed from a server, the information processing method including: a query generating step of generating a query indicating a combination of answers of a user to questions about preferences of the user so as to correspond to question information as information indicating the questions, the question information being transmitted from the server; and a matching step of obtaining the contents distributed from the server by performing matching between the query and provider side answer information as information indicating answers set to the questions by a provider providing the contents, the provider side answer information being transmitted from the server; wherein the matching step performs the matching between the query and the provider side answer information by calling a plurality of APIs (Application Programming Interfaces) on a Web application.

In the second mode of the present technology, a query indicating a combination of answers of a user to questions about preferences of the user is generated so as to correspond to question information as information indicating the questions, the question information being transmitted from a server, and the contents distributed from the server are obtained by performing matching between the query and provider side answer information as information indicating answers set to the questions by a provider providing the contents, the provider side answer information being transmitted from the server. The matching between the query and the provider side answer information is performed by calling a plurality of APIs.

According to the first and second modes of the present technology, contents according to needs at a given time can be obtained.

BRIEF DESCRIPTION OF THE DRAWINGS

FIG. 6 is a diagram of assistance in explaining an example of the syntax of an XML schema;

FIG. 7 is a diagram of assistance in explaining an example of a PDI-Q;

FIG. 8 is a diagram of assistance in explaining an example of screen display in interaction with a user;

FIG. 10 is a diagram of assistance in explaining an example of screen display in interaction with the user;

FIG. 11 is a diagram of assistance in explaining an example of screen display in interaction with the user;

FIG. 13 is a diagram of assistance in explaining an example of a PDI-A;

FIG. 14 is a diagram of assistance in explaining an example of a provider side PDI-A;

FIG. 15 is a diagram of assistance in explaining an example of the provider side PDI-A;

FIG. 29 is a diagram of assistance in explaining a configuration of a Service fragment;

FIG. 30 is a diagram of assistance in explaining a configuration of a Schedule fragment;

FIG. 31 is a diagram of assistance in explaining a configuration of a Content fragment;

FIG. 36 is a diagram showing an example of the syntax of a PDI descriptor.

DETAILED DESCRIPTION OF THE PREFERRED EMBODIMENTS

Preferred embodiments of the present technology will hereinafter be described with reference to the drawings.

Example of Configuration of Broadcasting System

Figure 1:
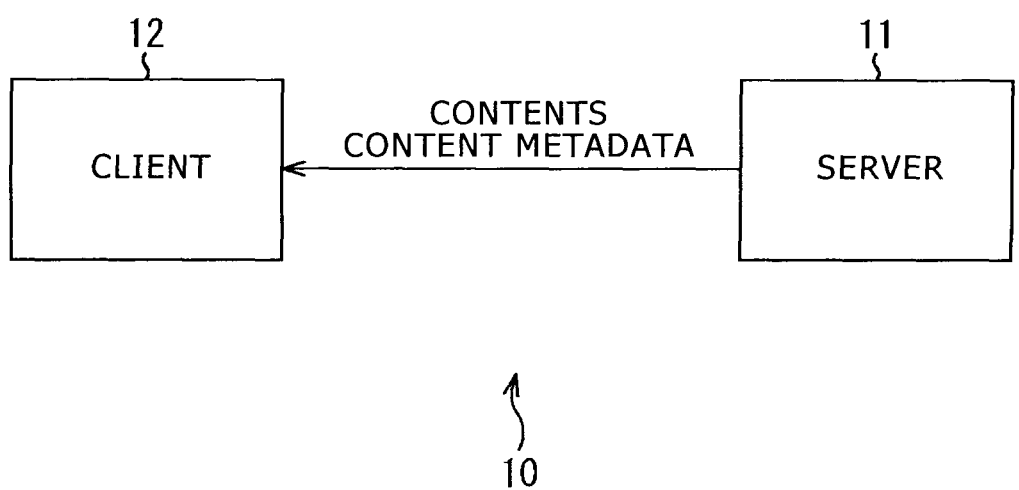
FIG. 1 is a block diagram showing an example of configuration of a broadcasting system according to a first embodiment of the present technology.

FIG. 1 shows an example of configuration of a broadcasting system according to an embodiment of the present technology.

A broadcasting system 10 of FIG. 1 includes: a server 11 installed on the side of a provider such as a broadcaster broadcasting (providing) a digital television program (hereinafter referred to as contents as appropriate) or the like; and a client terminal (hereinafter referred to as a client) 12 installed in the house of a user viewing the broadcast contents or the like. Incidentally, suppose that the client 12 is installed in each of the houses of a plurality of users. However, the client 12 can also be configured as a portable type terminal device such as a portable telephone, a PDA (Personal Digital Assistant), or the like.

In the broadcasting system 10, the server 11 sends out content metadata on the contents as a signal of a digital broadcast wave to the client 12 together with the contents. The client 12 reproduces or stores only contents desired by the user by filtering the contents on the basis of the content metadata sent out together with the contents. Incidentally, the content metadata may be sent out before the contents are sent out, instead of being sent out together with the contents.

Example of Hardware Configuration of Server

Figure 2:
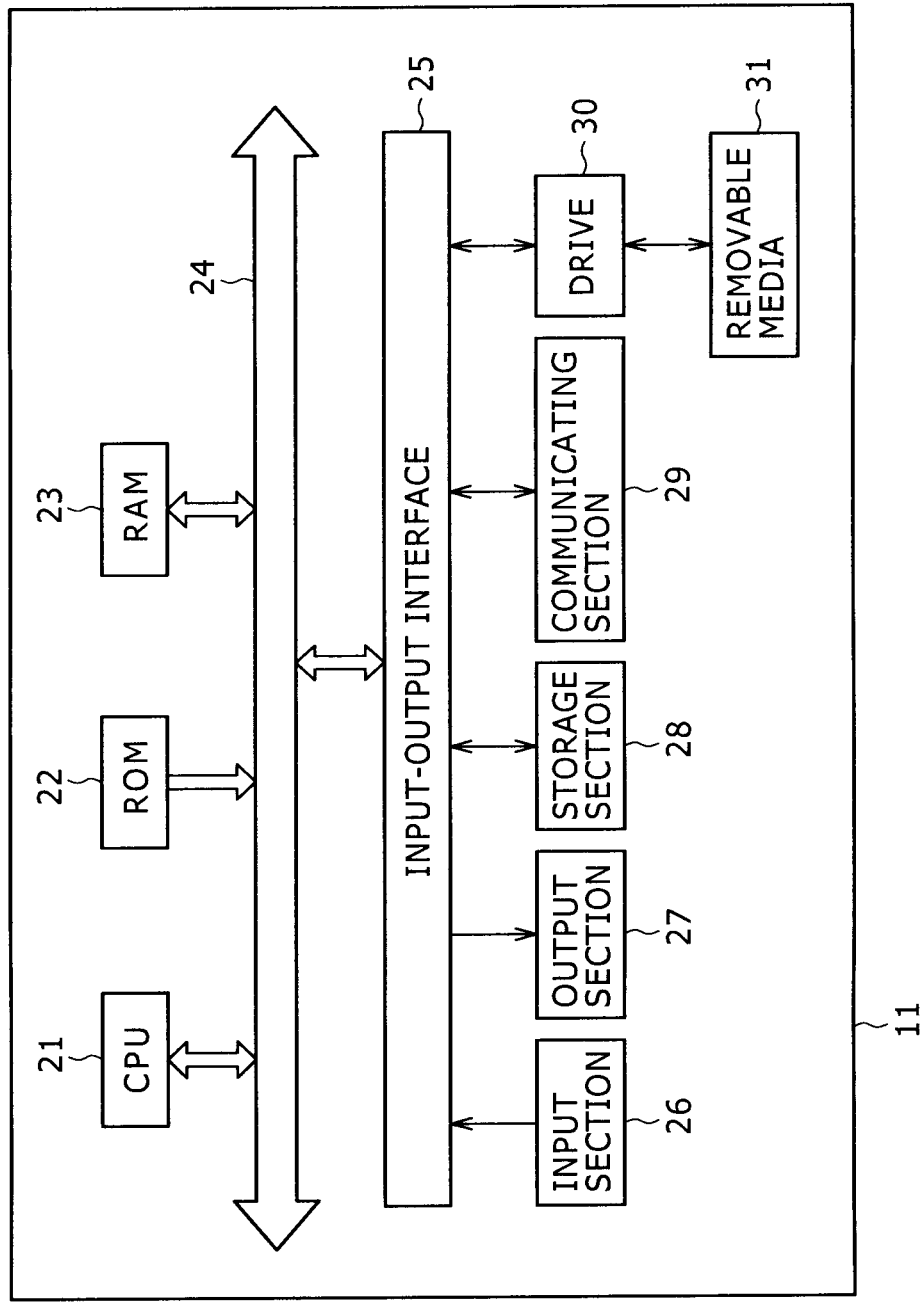
FIG. 2 is a block diagram showing an example of hardware configuration of a server.

FIG. 2 shows an example of hardware configuration of the server 11. In FIG. 2, the server 11 is configured based on a computer, for example.

A CPU (Central Processing Unit) 21 performs various kinds of processing according to a program stored in a ROM (Read Only Memory) 22 or a program loaded from a storage section 28 into a RAM (Random Access Memory) 23. The RAM 23 also stores data necessary for the CPU 21 to perform the various kinds of processing, and the like as appropriate.

The CPU 21, the ROM 22, and the RAM 23 are interconnected via a bus 24. The bus 24 is also connected with an input-output interface 25.

The input-output interface 25 is connected with an input section 26 composed of a keyboard, a mouse, and the like, an output section 27 composed of a display formed by an LCD (Liquid Crystal Display), an organic EL (Electro Luminescence), or the like, a speaker, and the like, the storage section 28 composed of a hard disk or the like, and a communicating section 29 composed of a modem, a terminal adapter, or the like. The communicating section 29 communicates with an external device via a network not shown in the figure. In addition, a program may be obtained via the communicating section 29 and stored in the storage section 28.

The input-output interface 25 is also connected with a drive 30 as required. Removable media 31 such as a magnetic disk, an optical disk, a magneto-optical disk, a semiconductor memory, and the like are loaded into the drive 30 as appropriate. A computer program read from them is installed into the storage section 28 as required.

Incidentally, though not shown, the hardware of the client 12 is also configured as shown in FIG. 2.

Example of Functional Configuration of Server

An example of functional configuration of the server 11 will next be described with reference to FIG. 3.

The server 11 includes a PDI-Q generator 41, a communicating section 42, a PDI-A generator 43, a metadata distributor 44, a content storing section 45, and a content distributor 46.

The PDI-Q generator 41 generates a PDI-Q (Preference Demographic and Interest-Question), which is information indicating questions about preferences of the user (viewer) of the client 12. The PDI-Q generator 41 transmits the PDI-Q to the client 12 via the communicating section 42, and supplies the PDI-Q to the PDI-A generator 43.

The communicating section 42 transmits various kinds of data supplied from the PDI-Q generator 41, the metadata distributor 44, and the content distributor 46 to the client 12 in response to a request from the client 12.

The PDI-A generator 43 generates a PDI-A (Preference Demographic and Interest-Answer), which is information indicating answers set on the side of the provider to the above-described questions about the preferences of the user of the client 12, the PDI-A corresponding to the PDI-Q from the PDI-Q generator 41, on the basis of the PDI-Q. The PDI-A generator 43 supplies the PDI-A to the metadata distributor 44.

The metadata distributor 44 identifies (refers to) contents corresponding to the answers set on the side of the provider from contents stored in the content storing section 45 on the basis of the PDI-A from the PDI-A generator 43. The metadata distributor 44 generates content metadata including the PDI-A as content metadata on the identified contents, and transmits the content metadata including the PDI-A to the client 12 via the communicating section 42.

The content storing section 45 stores various contents to be distributed to the client 12.

The content distributor 46 obtains the contents identified by the metadata distributor 44 from the contents stored in the content storing section 45. The content distributor 46 transmits the contents to the client 12 via the communicating section 42.

Example of Functional Configuration of Client

An example of functional configuration of the client 12 will next be described with reference to FIG. 4.

The client 12 includes a communicating section 51, a PDI-A generator 52, a PDI store 53, a content filter 54, a content reproducing section 55, and a content storing section 56.

The communicating section 51 receives various kinds of data transmitted from the server 11, and supplies the various kinds of data to the PDI-A generator 52 or the content filter 54. The communicating section 51 also transmits a request to the server 11 to the server 11.

The PDI-A generator 52 generates a PDI-A indicating answers of the user of the client 12 to the questions about the preferences of the user, the PDI-A corresponding to the PDI-Q transmitted from the server 11, on the basis of the PDI-Q. The PDI-A generator 52 stores the PDI-A in the PDI store 53.

The PDI store 53 stores the PDI-A from the PDI-A generator 52. The PDI-A stored in the PDI store 53 is accessed by a file system, and output to the content filter 54 as required.

The content filter 54 reads out the PDI-A from the PDI store 53, and filters the contents distributed from the server 11 by performing matching between the PDI-A from the PDI store 53 and the PDI-A included in the content metadata on the contents transmitted from the server 11. The content filter 54 supplies contents obtained by the filtering to the content reproducing section 55 or the content storing section 56 according to a result of the filtering. Incidentally, the content filter 54 is provided as a Web application executed on a Web browser, and performs the matching by calling a plurality of APIs (Application Programming Interfaces) to filter the contents.

The content reproducing section 55 reproduces the contents from the content filter 54. In addition, the content reproducing section 55 obtains contents from the content storing section 56, and reproduces the contents.

The content storing section 56 stores (records therein) the contents from the content filter 54.

Example of Process of Transmitting and Receiving Contents

A process of transmitting and receiving contents in the broadcasting system 10 will next be described with reference to a flowchart of FIG. 5. In the process of transmitting and receiving contents in the broadcasting system 10, the server 11 performs a content distributing process, whereby the contents are distributed, and the client 12 performs a content obtaining process, whereby the contents are obtained.

On the side of the provider such as the broadcaster or the like, for example, when a sponsor of contents to be broadcast (distributed) or the broadcaster itself requests the distribution of the contents to viewers having specific preferences or attributes, the PDI-Q generator 41 of the server 11 generates a PDI-Q for asking a viewer, that is, the user of the client 12 a question about the preferences or attributes of the user according to an operation by staff on the side of the provider in step S11.

Example of Syntax of XML Schema

An example of the syntax of an XML (Extensible Markup Language) schema for constructing a PDI-Q and a PDI-A will be described in the following with reference to FIG. 6.

In FIG. 6, a first line shows a declaration and a definition for the PDI-Q to be identified, and a second line shows the declaration of the name and type of questions as a whole defined as the PDI-Q.

A third to a 12th line show the declaration of the name and type of each of the questions declared in the second line. Specifically, a question type "IntegerAnswerType" defined under the name of "QIA" in the fifth line indicates that the question requests an answer of an integral value type. A question type "BooleanAnswerType" defined under the name of "QBA" in the sixth line indicates that the question requests an answer of a logical value type. A question type "SelectionAnswerType" defined under the name of "QSA" in the seventh line indicates that the question requests an answer of an answer selection type. A question type "TextAnswerType" defined under the name of "QTA" in the eighth line indicates that the question requests an answer of a character string type. A question type "AnyAnswerType" defined under the name of "QAA" in the ninth line indicates that the question does not limit the type of an answer.

A 13th to 44th line show the declaration of each of elements the questions defined under the names of "QIA," "QBA," "QSA," and "QTA" among the questions declared as described above. In particular, id elements shown in the 15th line, the 24th line, the 31st line, and the 40th line represent IDs (Identifiers) for identifying the items of the respective questions. The following is defined as a first format of an ID.

"common:[category:]question-ID"

In the first format, "common" indicates that the question identified by the id element is a common question defined irrespective of the provider, "category" represents the category of the question, and "question-ID" represents the identifier of the question. Incidentally, as required, "category" may have a hierarchical nested structure as follows, for example.

"common:[category1:category2:category3: . . . ]question-ID"

An id element is also defined as follows as a second format.

"providerName:[category:]question-ID"

In the second format, "providerName" represents the name of the provider that has set the question identified by the id element. Incidentally, "category" and "question-ID" are similar to those in the first format.

The questions defined as PDI-Q are thus classified according to the id elements into questions not dependent on the provider providing the contents (questions common to providers) and questions defined independently by the provider providing the contents.

In the following description, as appropriate, questions not dependent on the provider providing the contents and answers to the questions will be referred to as a provider common filtering parameter, and questions defined independently by the provider providing the contents and answers to the questions will be referred to as a provider independent filtering parameter.

As described above, a provider common filtering parameter is defined so as to be independent of individual providers and common to the providers. Thus, the provider common filtering parameter is typically provided by a vendor (manufacturer or the like) of the client 12. Therefore the PDI-Q generator 41 of the server 11 can be provided on the side of the provider but can also be provided by the vendor of the client 12.

It is to be noted that the syntax for constructing a PDI-Q and a PDI-A is not limited to the example shown in FIG. 6.

Example of PDI-Q

An example of a PDI-Q constructed on the basis of the syntax of FIG. 6 will next be described with reference to FIG. 7.

In FIG. 7, "transactional" in a first line is a value indicating whether to nullify a recording/updating process (whether to perform a so-called rollback) retroactively to a state immediately before the contents of each item of the PDI-Q are recorded/updated in a case where not all of the contents of each item of the PDI-Q are recorded/updated due to some accident (an error in writing of a disk, the interruption of processing due to an increase in processing load, or the like) in the middle of the process of recording/updating the contents of each item of the PDI-Q in a storage area of the client 12 which storage area is not shown in the figures when the questions (group of questions) defined in the PDI-Q are updated in the client 12 to which the PDI-Q has been transmitted. When "transactional" is "true," the PDI-Q is rolled back.

A second to a fifth line define a question requesting an answer of a logical value type. <id>Common:111</id> in the third line represents the id element of the question. <q>Are you currently employed?</q> in the fourth line represents the question itself.

A sixth to a ninth line define a question requesting an answer of an integral value type. <id>Common:222</id> in the seventh line represents the id element of the question. <q>What is the age of the oldest member of the household who watches television?</q> in the eighth line represents the question itself. Incidentally, minInclusive="10" maxiInclusive="100" in the sixth line indicates that an answer to the question is restricted to an integral value of 10 to 100 both inclusive.

A tenth to a 17th line define a question requesting an answer of an answer selection type. <id>ProviderA:123</id> in the 11th line represents the id element of the question. <q>In which of the following sports are you most interested? (Multiple selection allowed)</q> in the 12th line represents the question itself. <a>Baseball</a> in the 13th line, <a>Basketball</a> in the 14th line, <a>Soccer</a> in the 15th line, and <a>Hockey/</a> in the 16th line each represent a choice as an answer to the question. Incidentally, minChoice="1" maxChoice="3" in the tenth line indicates that the number of answers to the question is restricted to one to three both inclusive among the choices.

An 18th to a 24th line define a question requesting an answer of an answer selection type. <id>ProviderA:ProgramX:123</id> in the 19th line represents the id element of the question. <q>Do you enjoy camping and outdoor recreation? (Only one selection)</q> in the 20th line represents the question itself. <a>Never</a> in the 21st line, <a>Occasionally</a> in the 22nd line, and <a>Frequently</a> in the 23rd line each represent a choice as an answer to the question. Incidentally, maxChoice="1" in the 18th line indicates that the number of answers to the question is restricted to one.

Thus, in the PDI-Q, according to the type of a question, candidates for an answer to the question and a constraint condition for the answer are defined.

A 25th to a 28th line define a question requesting an answer of a character string type. <id>ProviderA:321</id> in the 26th line represents the id element of the question. <q>Who's products are you most interested in recently?</q> in the 27th line represents the question itself.

In the following, the questions defined in the PDI-Q of FIG. 7 will correspondingly be referred to as the questions of the respective id elements. Specifically, the question defined in the second to fifth lines will be referred to as the question of "Common:111"; the question defined in the sixth to the ninth lines will be referred to as the question of "Common:222"; the question defined in the tenth to the 17th lines will be referred to as the question of "ProviderA:123"; the question defined in the 18th to the 24th lines will be referred to as the question of "ProviderA:ProgramX:123"; and the question defined in the 25th to the 28th lines will be referred to as the question of "ProviderA:321."

In this case, the question of "Common:111" and the question of "Common:222" are classified as provider common filtering parameters, and the question of "ProviderA:123," the question of "ProviderA:ProgramX:123," and the question of "ProviderA:321" are classified as provider independent filtering parameters. For example, the question of "Common:111" indicates that the question is set so as to be common to providers and has an identifier of "111." The question of "ProviderA:ProgramX:123" indicates that the question is set by the provider as "ProviderA," is under a category (program ID) of "ProgramX," and has an identifier of "123."

Figure 5:
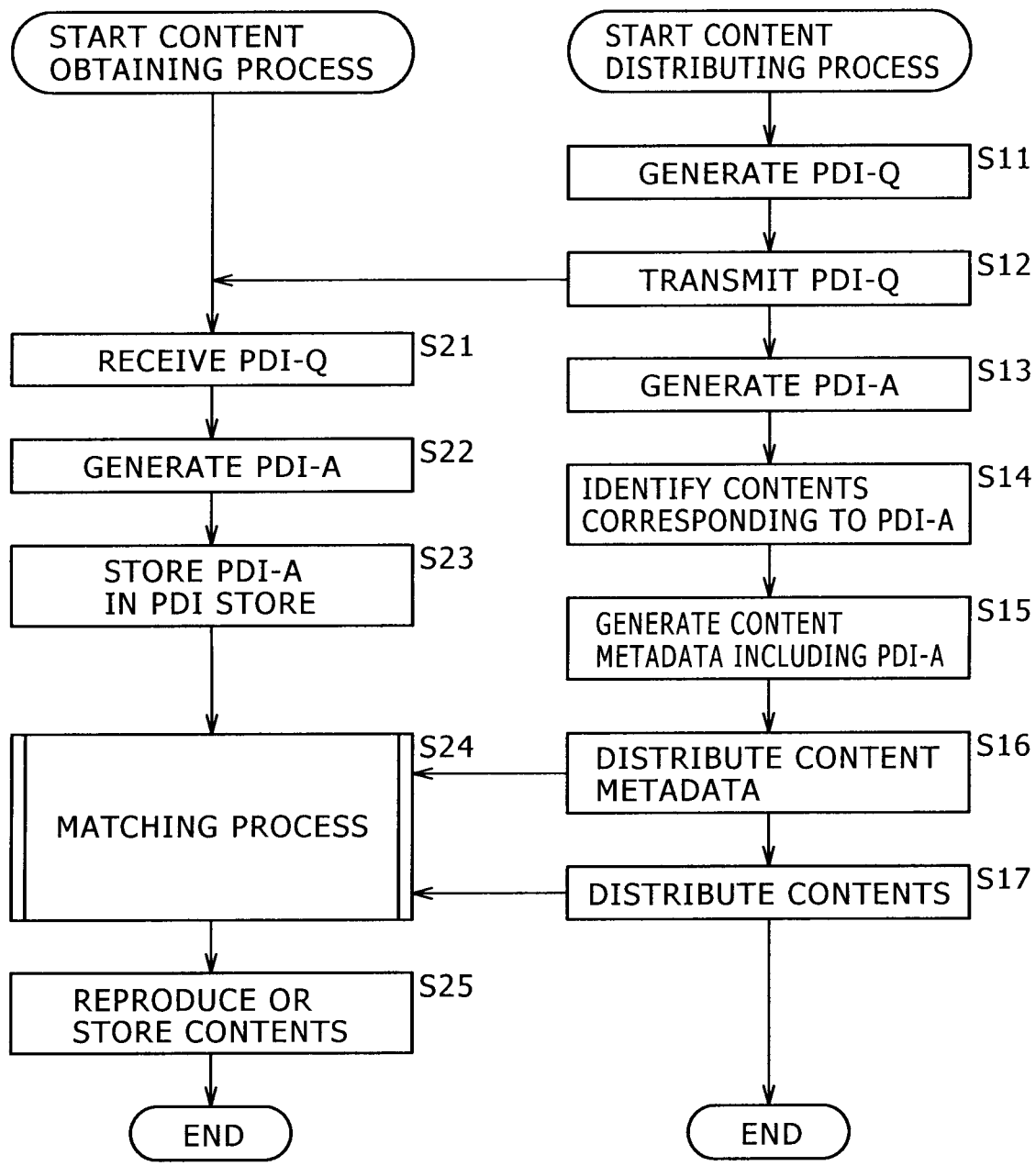
FIG. 5 is a flowchart of assistance in explaining a process of transmitting and receiving contents.

Returning to the flowchart of FIG. 5, in step S12, the PDI-Q generator 41 of the server 11 transmits the generated PDI-Q to the client 12 via the communicating section 42, and supplies the generated PDI-Q to the PDI-A generator 43.

In step S21, the communicating section 51 of the client 12 receives the PDI-Q transmitted from the server 11, and supplies the PDI-Q to the PDI-A generator 52.

Incidentally, for example, the PDI-Q is received by the client 12 each time the PDI-Q is broadcast (transmitted) at predetermined time intervals from a broadcasting station as the provider in which the server 11 is installed. The PDI-Q may also be received by the client 12 when the client 12 sets a channel to the broadcasting station in which the server 11 is installed.

In step S22, the PDI-A generator 52 of the client 12 generates a PDI-A for the questions defined in the PDI-Q received in the communicating section 51. Specifically, when the PDI-Q from the server 11 is received, the PDI-A generator 52 makes a display section not shown in the figures display screens corresponding to the questions defined in the PDI-Q, and makes the user (viewer) of the client 12 input or select answers to the questions. In this manner, the PDI-A generator 52 generates the PDI-A indicating the answers. That is, the PDI-A generator 52 generates the PDI-A indicating the answers to the questions defined in the PDI-Q by interacting with the user.

Then, in step S23, the PDI-A generator 52 stores the generated PDI-A in the PDI store 53.

Example of Screen Display in Interaction of PDI-A Generator with User

Examples of screen display in interaction of the PDI-A generator 52 with the user will be described in the following with reference to FIGS. 8 to 12. Incidentally, suppose in the following that the client 12 has received the PDI-Q described with reference to FIG. 7, and that the display section not shown in the figures of the client 12 sequentially displays screens corresponding to the group of questions defined in the received PDI-Q.

FIG. 8 shows an example of screen display corresponding to the question of "Common:111" among the questions defined in the PDI-Q described with reference to FIG. 7. In FIG. 8, the question "Are you currently employed?" shown in the fourth line of FIG. 7 is displayed in a question presenting section 61. Also displayed are a message "SELECT EITHER," which prompts the user to input an answer to the question, a selection button 62-1 for the user to select "Yes" as an answer to the question, and a selection button 62-2 for the user to select "No" as an answer to the question.

Figure 9:
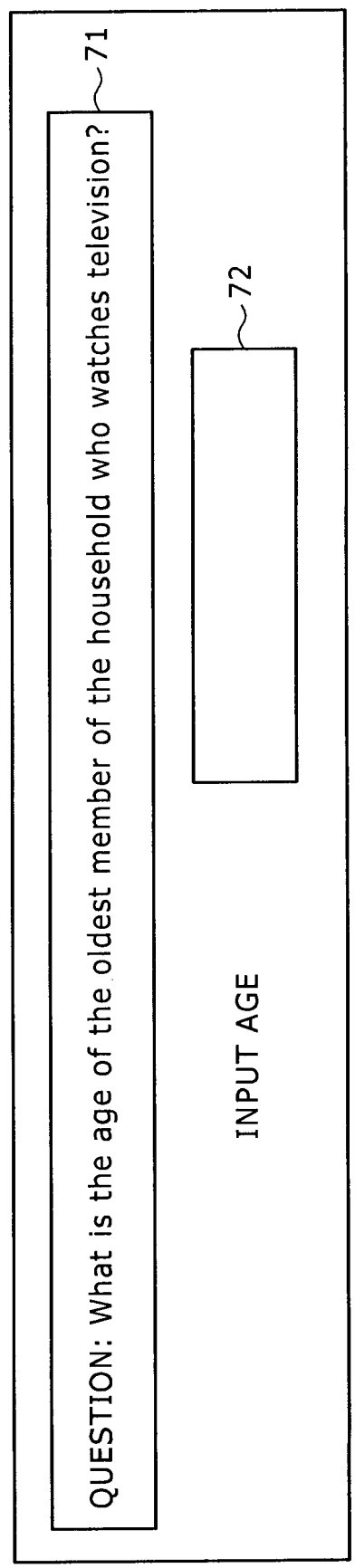
FIG. 9 is a diagram of assistance in explaining an example of screen display in interaction with the user.

FIG. 9 shows an example of screen display corresponding to the question of "Common:222" among the questions defined in the PDI-Q described with reference to FIG. 7. In FIG. 9, the question "What is the age of the oldest member of the household who watches television?" shown in the eighth line of FIG. 7 is displayed in a question presenting section 71. Also displayed are a message "INPUT AGE," which prompts the user to input an answer to the question, and an answer input section 72 for the user to input an integral value as an answer to the question.

FIG. 10 shows an example of screen display corresponding to the question of "ProviderA:123" among the questions defined in the PDI-Q described with reference to FIG. 7. In FIG. 10, the question "In which of the following sports are you most interested? (Multiple selection allowed)" shown in the 12th line of FIG. 7 is displayed in a question presenting section 81. Also displayed are a message "SELECT ONE TO THREE OF THE FOLLOWING," which prompts the user to input an answer to the question, and selection buttons 82-1 to 82-4 for the user to select the choices "Baseball," "Basketball," "Soccer," and "Hockey" as an answer to the question.

FIG. 11 shows an example of screen display corresponding to the question of "ProviderA:ProgramX:123" among the questions defined in the PDI-Q described with reference to FIG. 7. In FIG. 11, the question "Do you enjoy camping and outdoor recreation?(Only one selection)" shown in the 20th line of FIG. 7 is displayed in a question presenting section 91. Also displayed are a message "SELECT ONLY ONE OF THE FOLLOWING," which prompts the user to input an answer to the question, and selection buttons 92-1 to 92-3 for the user to select the choices "Never," "Occasionally," and "Frequently" as an answer to the question.

Figure 12:
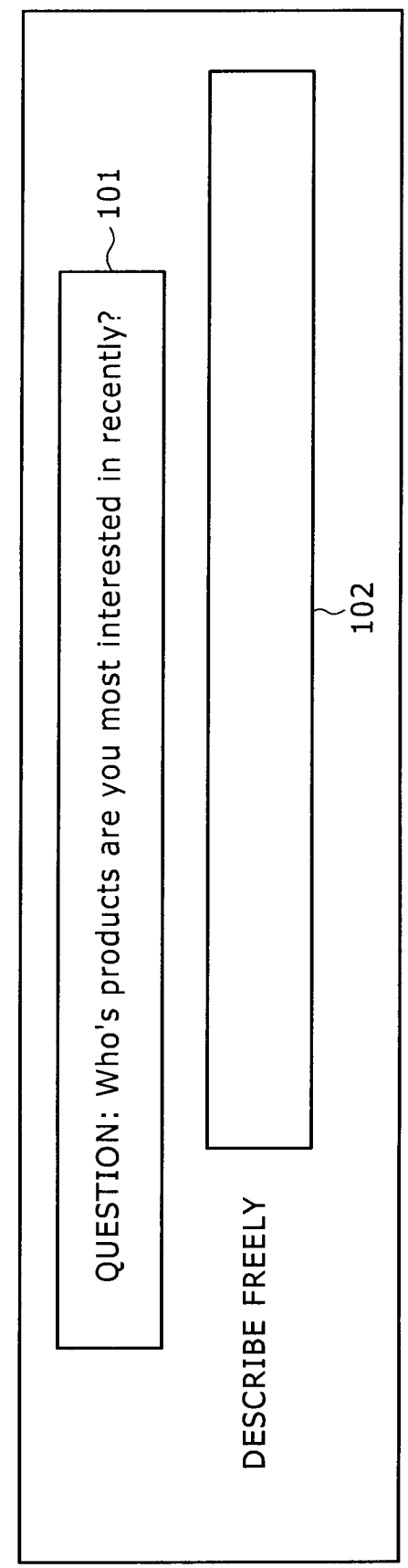
FIG. 12 is a diagram of assistance in explaining an example of screen display in interaction with the user.

FIG. 12 shows an example of screen display corresponding to the question of "ProviderA:321" among the questions defined in the PDI-Q described with reference to FIG. 7. In FIG. 12, the question "Who's products are you most interested in recently?" shown in the 27th line of FIG. 7 is displayed in a question presenting section 101. Also displayed are a message "DESCRIBE FREELY," which prompts the user to input an answer to the question, and an answer input section 102 for the user to input a character string as an answer to the question.

The PDI-A generator 52 generates the PDI-A corresponding to the PDI-Q by thus making the user input or select answers to the questions defined in the PDI-Q through the screen display described with reference to FIGS. 8 to 12.

Incidentally, the screen display described with reference to FIGS. 8 to 12 may be made shortly after the PDI-Q is received, or may be made when the user gives an instruction to display the set screens, for example, after the PDI-Q is received and retained in a storage section not shown in the figures.

Example of PDI-A

An example of the PDI-A generated by the PDI-A generator 52 will be described in the following with reference to FIG. 13. The PDI-A shown in FIG. 13 is a PDI-A generated on the basis of the selection or input of answers by the user in response to the screen display shown in FIGS. 8 to 12.

Specifically, a second to a fifth line show an answer of the user to the question presented by the screen display described with reference to FIG. 8. Specifically, <id>Common:111</id> in the third line represents the id element of the question presented by the screen display of FIG. 8. <a>true</a> in the fourth line indicates that the user selected the selection button 62-1 (answer "Yes") in the screen display of FIG. 8 as an answer to the question.

A sixth to a ninth line show an answer of the user to the question presented by the screen display described with reference to FIG. 9. Specifically, <id>Common:222</id> in the seventh line represents the id element of the question presented by the screen display of FIG. 9. <a>34</a> in the eighth line indicates that the user input "34" as an integral value in the answer input section 72 in the screen display of FIG. 9 as an answer to the question.

A tenth to a 15th line show an answer of the user to the question presented by the screen display described with reference to FIG. 10. Specifically, <id>ProviderA:123</id> in the 11th line represents the id element of the question presented by the screen display of FIG. 10. <a>Baseball</a> in the 12th line, <a>Soccer</a> in the 13th line, and <a>Hockey</a> in the 14th line indicate that the user selected the selection buttons 82-1, 82-3, and 82-4 in the screen display of FIG. 10 as an answer to the question.

A 16th to a 19th line show an answer of the user to the question presented by the screen display described with reference to FIG. 11. Specifically, <id>ProviderA:ProgramX:123</id> in the 17th line represents the id element of the question presented by the screen display of FIG. 11. <a>Occasionally</a> in the 18th line indicates that the user selected the selection button 92-2 in the screen display of FIG. 11 as an answer to the question.

A 20th to a 23rd line show an answer of the user to the question presented by the screen display described with reference to FIG. 12. Specifically, <id>ProviderA:321</id> in the 21st line represents the id element of the question presented by the screen display of FIG. 12. <a>Somy</a> in the 22nd line indicates that the user input "Somy" as a character string in the answer input section 102 in the screen display of FIG. 12 as an answer to the question.

The PDI-A generator 52 supplies the PDI-A thus generated to the PDI store 53, and stores the PDI-A in the PDI store 53. As will be described later, the PDI-A stored in the PDI store 53 is used when whether contents distributed from the server 11 match the preferences of the user of the client 12 is determined.

Returning to the flowchart of FIG. 5, in step S13, the PDI-A generator 43 of the server 11 generates a PDI-A for the questions defined in the PDI-Q from the PDI-Q generator 41, and supplies the PDI-A to the metadata distributor 44. Specifically, when the PDI-Q has been generated by operation of the staff of the broadcasting station (side of the provider), the PDI-A generator 43 makes screens corresponding to the questions defined in the PDI-Q as described above with reference to FIGS. 8 to 12, for example, displayed on a display section not shown in the figures, and makes the staff of the broadcasting station input or select answers to the questions, thereby generating the PDI-A indicating the answers. At this time, the staff of the broadcasting station input or select answers corresponding to contents to be distributed as answers to the questions defined in the PDI-Q. That is, the PDI-A generated by the PDI-A generator 43 indicates information (answers) for the side of the provider to take the preferences of the user (viewer) of the client 12 into consideration and have the viewer view the contents to be distributed later.

In step S14, the metadata distributor 44 identifies (refers to) contents corresponding to the PDI-A from the PDI-A generator 43 from contents stored in the content storing section 45 on the basis of the PDI-A. The contents identified in this case may be contents whose content metadata, which is attached to the stored contents in advance, has a higher degree of similarity to the PDI-A from the PDI-A generator 43 than a predetermined value, or may be contents selected by the staff of the broadcasting station in advance as contents desired to be viewed by the user. Incidentally, the content distributor 46 obtains the contents identified by the metadata distributor 44 from the content storing section 45.

In step S15, the metadata distributor 44 generates new content metadata including the PDI-A on the basis of the content metadata attached in advance to the contents identified in step S14 and the PDI-A from the PDI-A generator 43.

In step S16, the communicating section 42 distributes the content metadata generated by the metadata distributor 44 in response to a request from the client 12. At this time, as the content metadata, content metadata defined by a standardization organization may be transmitted in addition to the content metadata generated by the metadata distributor 44.

In addition, in step S17, the communicating section 42 distributes the contents obtained by the content distributor 46 in response to a request from the client 12.

Meanwhile, in step S23, the content filter 54 of the client 12 performs a matching process. The content filter 54 performs matching between the PDI-A stored in the PDI store 53 and the PDI-A included in the content metadata from the server 11, thereby obtaining contents from the server 11. Incidentally, in the following, in order to distinguish the PDI-A stored in the PDI store 53 from the PDI-A included in the content metadata from the server 11, the former will be referred to as a user side PDI-A, and the latter will be referred to as a provider side PDI-A.

Example of Matching Process in Content Filter

Suppose in this case that the PDI-A described with reference to the flowchart of FIG. 13 is generated and stored as the user side PDI-A, and that a PDI-A shown in FIG. 14 is transmitted as the provider side PDI-A from the server 11.

The provider side PDI-A shown in FIG. 14 has the same basic configuration as the user side PDI-A shown in FIG. 13, and therefore detailed description thereof will be omitted. The provider side PDI-A indicates that "false" is selected as an answer to the question of "Common:111," that "Baseball" is selected as an answer to the question of "ProviderA:123," and that "Never" is selected as an answer to the question of "ProviderA:ProgramX:123."

At this time, the content filter 54 compares the user side PDI-A with the provider side PDI-A, and determines that the user side PDI-A and the provider side PDI-A match each other when there is at least one identical answer to a question, or determines that the user side PDI-A and the provider side PDI-A do not match each other when there is no identical answer to a question. In this case, there is an identical answer in that the answer to the question of "ProviderA:123" in the user side PDI-A shown in FIG. 13 and the answer to the question of "ProviderA:123" in the provider side PDI-A shown in FIG. 14 each include "Baseball." It is thus determined that the user side PDI-A and the provider side PDI-A match each other.

Next, suppose that a PDI-A shown in FIG. 15 is transmitted as the provider side PDI-A from the server 11.

The provider side PDI-A shown in FIG. 15 indicates that "Basketball" is selected as an answer to the question of "ProviderA:123," and that "Never" is selected as an answer to the question of "ProviderA:ProgramX:123."

In this case, the answers to the questions in the user side PDI-A shown in FIG. 13 and the answers to the questions in the provider side PDI-A shown in FIG. 15 include no identical answer. It is thus determined that the user side PDI-A and the provider side PDI-A do not match each other.

As described above, the content filter 54 is provided as a Web application, and performs the matching process by calling a plurality of APIs.

Details of Matching Process

Figure 16:
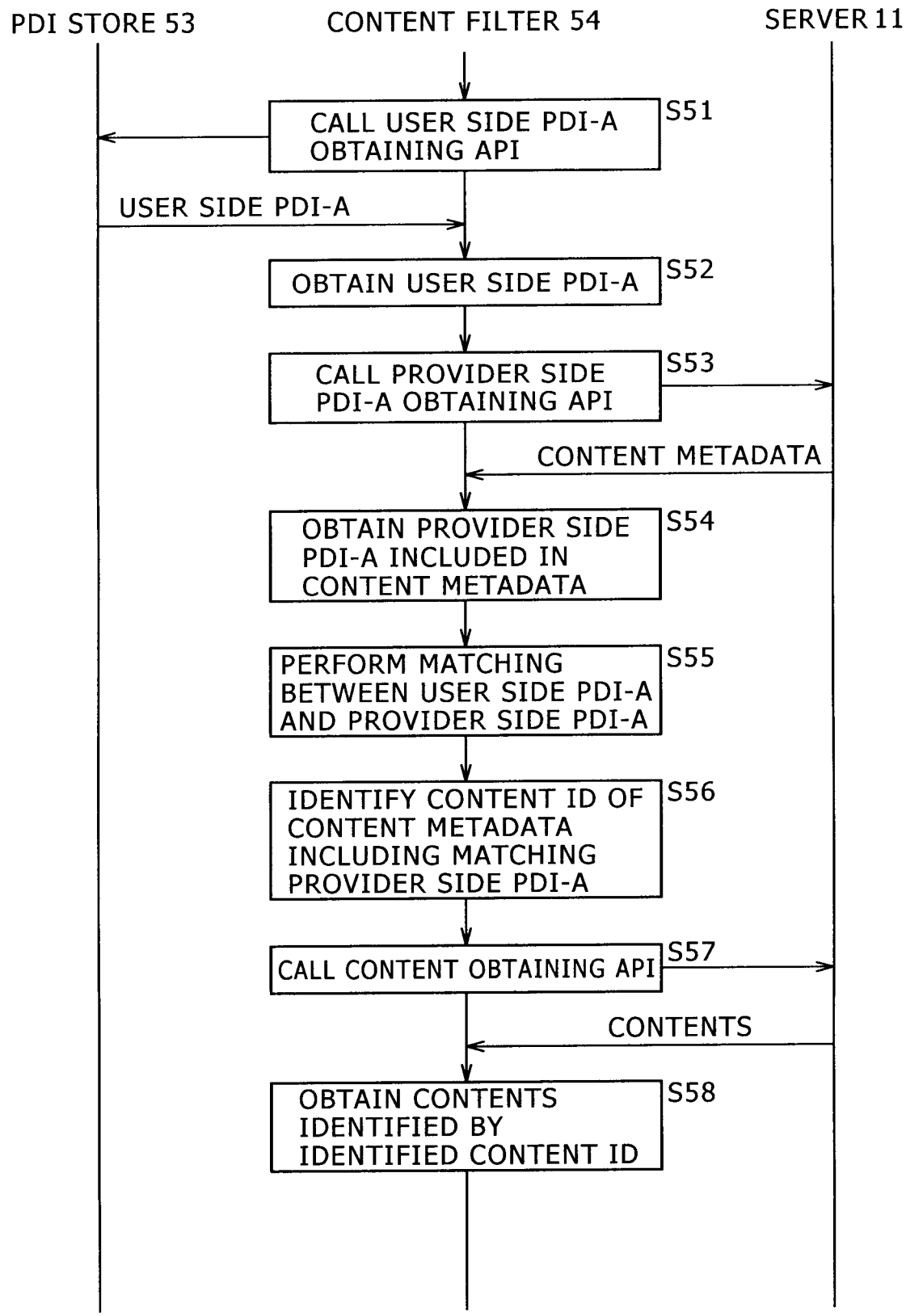
FIG. 16 is a flowchart of assistance in explaining details of a matching process.

Details of the matching process performed by the content filter 54 by calling a plurality of APIs in step S24 will next be described in the following with reference to a flowchart of FIG. 16.

First, in step S51, the content filter 54 calls a user side PDI-A obtaining API, which is an API for obtaining the user side PDI-A from the PDI store 53.

The input argument and the output argument of the user side PDI-A obtaining API are as follows.

Input argument: the id element of a question whose type is "QXA" (QXA/@id)

Output argument: the PDI Table storing the user side PDI-A for the question of the type "QXA" specified by the input argument Incidentally, "QXA" represents one or all of the names "QIA," "QBA," "QSA," "QTA," and "QAA" indicating question types as described above. For example, when the input argument is set as QXA/@id=*, for example, all question types are specified. The PDI Table returned as the output argument represents a table storing the user side PDI-A described with reference to FIG. 13, for example. Thus, when the input argument is set as QXA/@id=*, all user side PDI-As stored in the PDI store 53 are returned as the output argument.

In step S52, the content filter 54 obtains the user side PDI-A returned as the output argument of the user side PDI-A obtaining API.

In step S53, the content filter 54 calls a provider side PDI-A obtaining API, which is an API for obtaining the provider side PDI-A from the server 11.

The input argument and the output argument of the provider side PDI-A obtaining API are as follows.

Input argument: a content ID (C_ID)

Output argument: the provider side PDI-A included in content metadata corresponding to the content ID specified by the input argument Incidentally, the content ID is information for identifying contents, and is associated also with content metadata on the contents. For example, when the input argument is set as C_ID=*, all contents are specified. Thus, when the input argument is set as C_ID=*, the server 11 is requested to distribute content metadata on all the contents, and the provider side PDI-A included in the content metadata distributed from the server 11 in response to the request is returned as the output argument.

In step S54, the content filter 54 obtains the provider side PDI-A returned as the output argument of the provider side PDI-A obtaining API.

In step S55, the content filter 54 performs matching between the user side PDI-A and the provider side PDI-A by the method described with reference to FIGS. 13 to 15.

In step S56, the content filter 54 identifies the content ID of the content metadata including the provider side PDI-A matching the user side PDI-A.

In step S57, the content filter 54 calls a content obtaining API, which is an API for obtaining contents from the server 11.

The input argument and the output argument of the content obtaining API are as follows.

Input argument: a content ID (C_ID)

Output argument: the contents identified by the content ID specified by the input argument and a reference to the contents As in the above, the content ID is information for identifying the contents, and is the content ID of the content metadata including the provider side PDI-A matching the user side PDI-A, which content ID is identified by the content filter 54. That is, the server 11 is requested to distribute the contents identified by the content ID of the content metadata including the provider side PDI-A matching the user side PDI-A, and the contents distributed from the server 11 in response to the request and the reference to the contents are returned as the output argument.

In step S58, the content filter 54 obtains the contents returned as the output argument of the content obtaining API, and supplies the contents to the content reproducing section 55 or the content storing section 56. The process then returns to step S24 in the flowchart of FIG. 5.

Specifically, when the contents distributed from the server 11 are supplied from the content filter 54 to the content reproducing section 55, the content reproducing section 55 reproduces the contents in step S25. When the contents distributed from the server 11 are supplied from the content filter 54 to the content storing section 56, the content storing section 56 stores (records therein) the contents in step S25. The stored contents are supplied to the content reproducing section 55 and reproduced by the content reproducing section 55 as appropriate according to an operating instruction by the user.

According to the above process, in the broadcasting system, on the side of the provider, a PDI-Q indicating questions about the preferences of the user is generated by the server, the PDI-Q is transmitted to the client terminal, and a provider side PDI-A indicating answers to the PDI-Q which answers are set on the side of the provider is distributed as content metadata on the corresponding contents. Thus, content metadata according to needs at a given time, other than content metadata defined by a standardization organization, can be attached as content metadata to the contents. Meanwhile, on the side of the user, a user side PDI-A indicating answers of the user to the PDI-Q from the server is generated by the client terminal, and matching between the generated user side PDI-A and the provider side PDI-A from the server is performed, whereby whether to obtain the contents distributed from the server is determined. Thus, the contents can be filtered by the content metadata according to the needs at the given time, other than content metadata defined by a standardization organization. It is thus possible to obtain contents according to the needs at the given time.

Incidentally, in the above description, the client 12 performs PDI-A matching in real time when contents are distributed from the server 11. However, all contents from the server 11 may be stored in advance, PDI-A matching may be performed in background processing, and contents corresponding to a matching PDI-A (provider side PDI-A) among the stored contents may be reproduced or contents corresponding to a non-matching PDI-A among the stored contents may be deleted.

In addition, the above description assumes that the user side PDI-A stored in the PDI store 53 is accessed by a file system. However, when the PDI store 53 is configured as a database, the user side PDI-A stored in the PDI store 53 is managed by a database management system (DBMS).

Details of Matching Process

Figure 17:
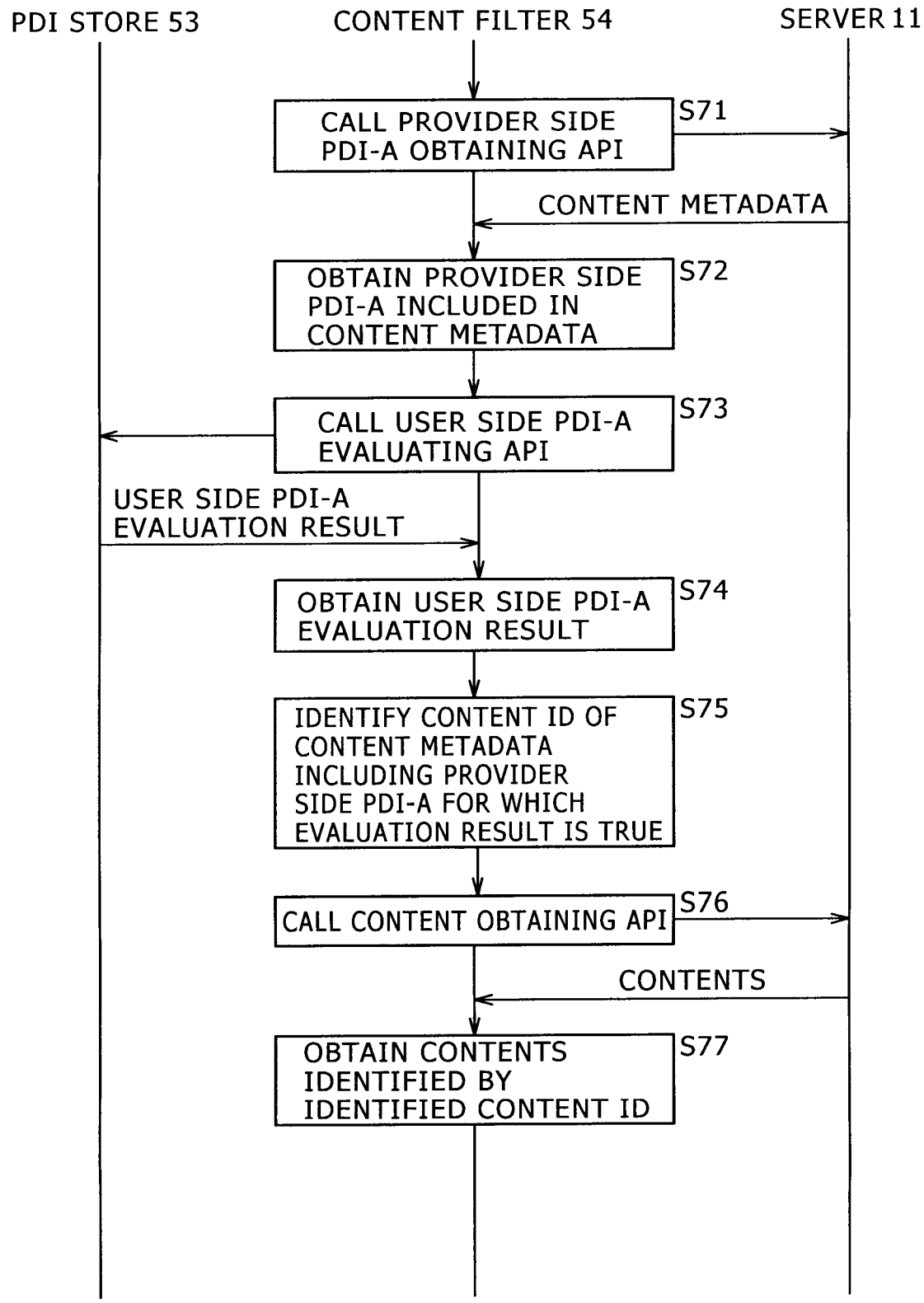
FIG. 17 is a diagram of assistance in explaining details of the matching process.

Details of a matching process in a case where the PDI store 53 is configured as a database will be described in the following with reference to a flowchart of FIG. 17.

First, in step S71, the content filter 54 calls a provider side PDI-A obtaining API, which is an API for obtaining a provider side PDI-A from the server 11.

In step S72, the content filter 54 obtains the provider side PDI-A returned as the output argument of the provider side PDI-A obtaining API.

In step S73, the content filter 54 calls a user side PDI-A evaluating API, which is an API for evaluating whether a user side PDI-A corresponding to the provider side PDI-A from the server 11 is stored in the PDI store 53.

The input argument and the output argument of the user side PDI-A evaluating API are as follows.

Input argument: the provider side PDI-A

Output argument: a result (true/false) of the evaluation as to whether a user side PDI-A corresponding to the provider side PDI-A specified by the input argument is stored Incidentally, the provider side PDI-A is the provider side PDI-A obtained by the provider side PDI-A obtaining API. When the user side PDI-A evaluating API passes the provider side PDI-A to the DBMS managing the data in the PDI store 53, the DBMS searches for a user side PDI-A corresponding to the provider side PDI-A. On the basis of a result of the search, the result of the evaluation as to whether a user side PDI-A corresponding to the provider side PDI-A is stored is returned as the output argument.

In step S74, the content filter 54 obtains the result of the user side PDI-A evaluation which result is returned as the output argument of the user side PDI-A evaluating API.

In step S75, the content filter 54 identifies the content ID of content metadata including the provider side PDI-A for which the result of the user side PDI-A evaluation is true.

In step S76, the content filter 54 calls a content obtaining API, which is an API for obtaining contents from the server 11.

In step S77, the content filter 54 obtains the contents returned as the output argument of the content obtaining API.

Thus, when the PDI store 53 is configured as a database, the content filter 54 can perform matching between the user side PDI-A and the provider side PDI-A by calling the user side PDI-A evaluating API.

In the above description, the content filter 54 compares the user side PDI-A and the provider side PDI-A expressed as instances with each other, and performs matching between the user side PDI-A and the provider side PDI-A according to whether there is at least one identical answer to a question. However, the content filter 54 may compare the user side PDI-A and the provider side PDI-A with each other by expressing one of the user side PDI-A and the provider side PDI-A as a query for evaluating the PDI-A.

A configuration in which the user side PDI-A and the provider side PDI-A are compared with each other by expressing one of the user side PDI-A and the provider side PDI-A as a query will be described in the following.

First Example of Matching Process Using Query for Evaluating PDI-A

First, a configuration in which a user side PDI-A and a provider side PDI-A are compared with each other by expressing the provider side PDI-A as a query will be described.

Figure 18:
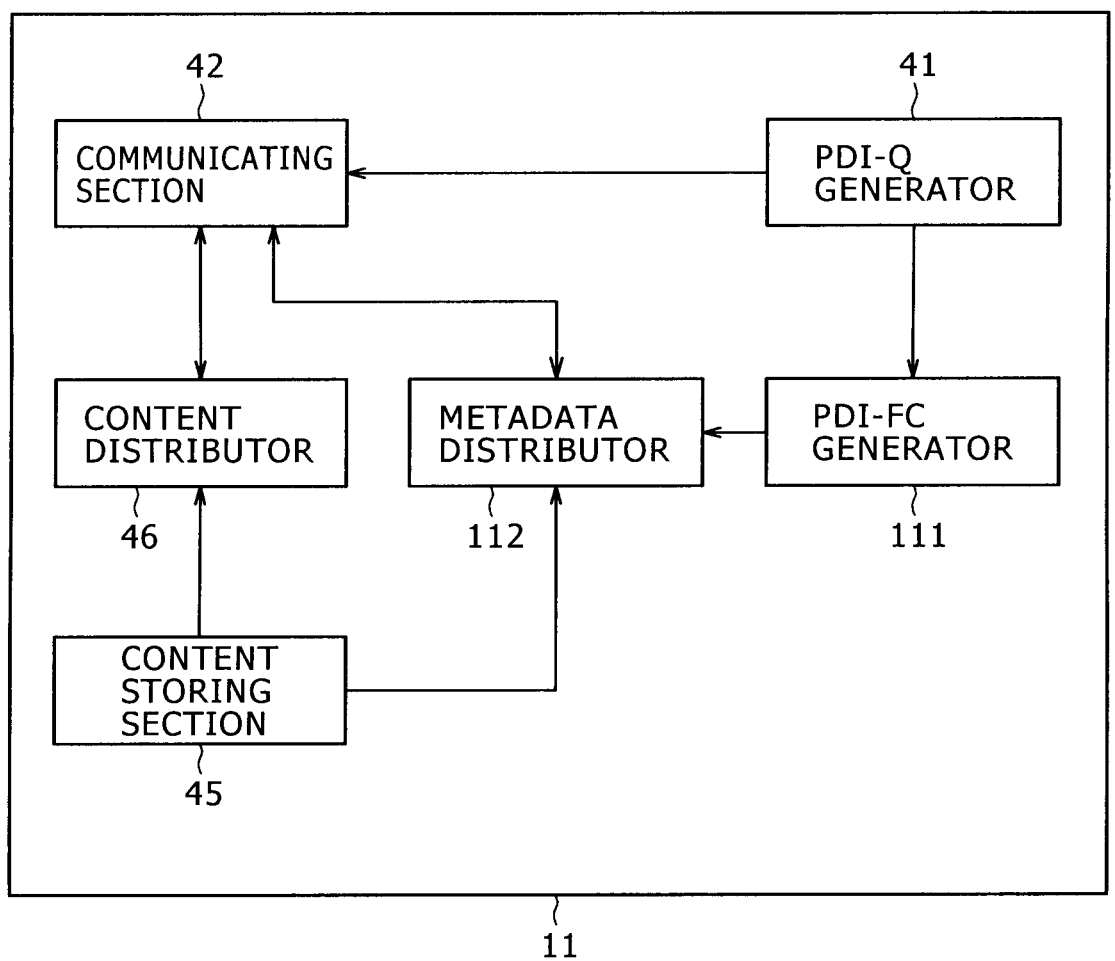
FIG. 18 is a block diagram showing another example of functional configuration of the server.

FIG. 18 shows an example of functional configuration of a server 11 in which a provider side PDI-A is expressed as a query.

The server 11 of FIG. 18 includes a PDI-Q generator 41, a communicating section 42, a content storing section 45, a content distributor 46, a PDI-FC generator 111, and a metadata distributor 112.

Figure 3:
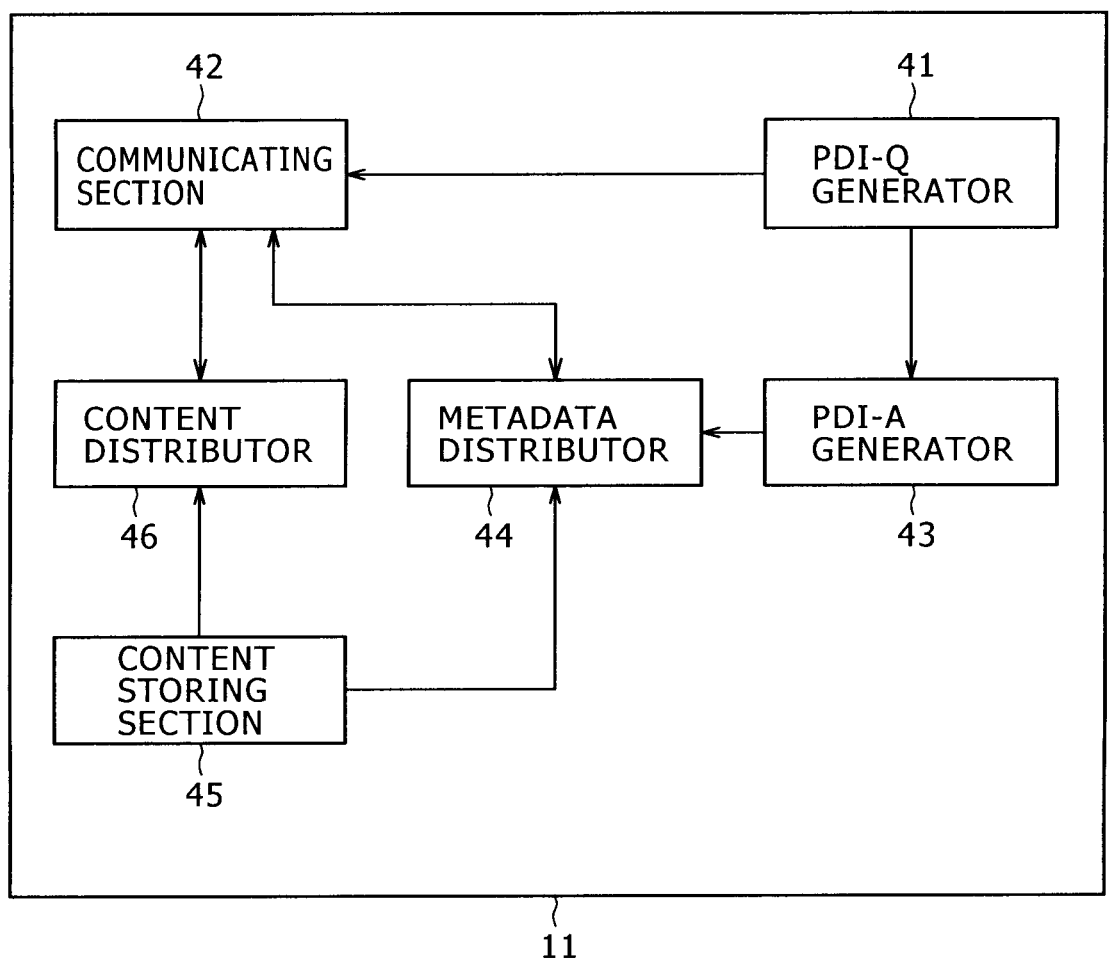
FIG. 3 is a block diagram showing an example of functional configuration of the server.

Incidentally, in the server 11 of FIG. 18, constitutions having similar functions to those provided in the server 11 of FIG. 3 will be identified by the same names and the same reference numerals, and description thereof will be omitted as appropriate.

Specifically, the server 11 of FIG. 18 is different from the server 11 of FIG. 3 in that the server 11 of FIG. 18 includes the PDI-FC generator 111 and the metadata distributor 112 in place of the PDI-A generator 43 and the metadata distributor 44.

The PDI-FC generator 111 generates a PDI-A (provider side PDI-A) corresponding to a PDI-Q from the PDI-Q generator 41 on the basis of the PDI-Q, generates a PDI-FC (Preference Demographic and Interest-Filtering Criteria) in which the generated provider side PDI-A is applied to a predetermined conditional statement, and supplies the PDI-FC to the metadata distributor 112.

The metadata distributor 112 identifies (refers to) contents corresponding to the PDI-FC from the PDI-FC generator 111 from contents stored in the content storing section 45 on the basis of the PDI-FC. The metadata distributor 112 generates content metadata including the PDI-FC as content metadata on the identified contents, and transmits the content metadata including the PDI-FC to a client 12 via the communicating section 42.

Figure 4:
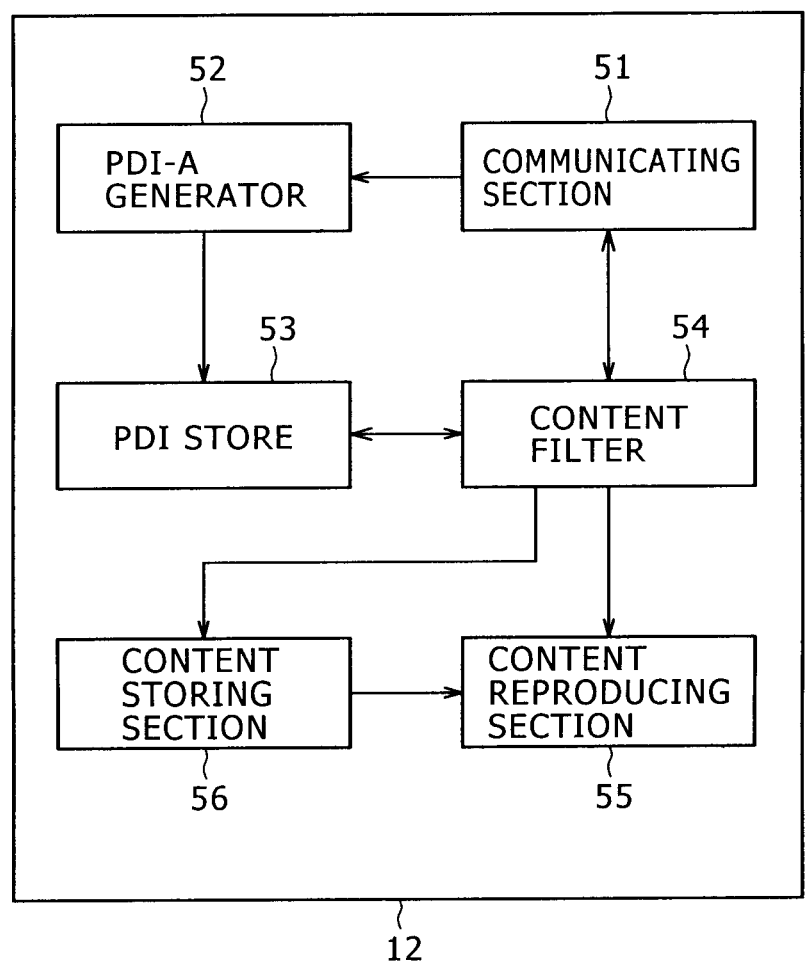
FIG. 4 is a block diagram showing an example of functional configuration of a client.

The client 12 in this example is identical to the client 12 of FIG. 4 except that the content filter 54 in FIG. 4 reads the user side PDI-A from the PDI store 53, and filters contents on the basis of the user side PDI-A and the PDI-FC included in the content metadata transmitted from the server 11. Therefore description of the client 12 in this example will be omitted.

A process of transmitting and receiving contents in a broadcasting system 10 including the server 11 of FIG. 18 will next be described with reference to a flowchart of FIG. 19.

Figure 19:
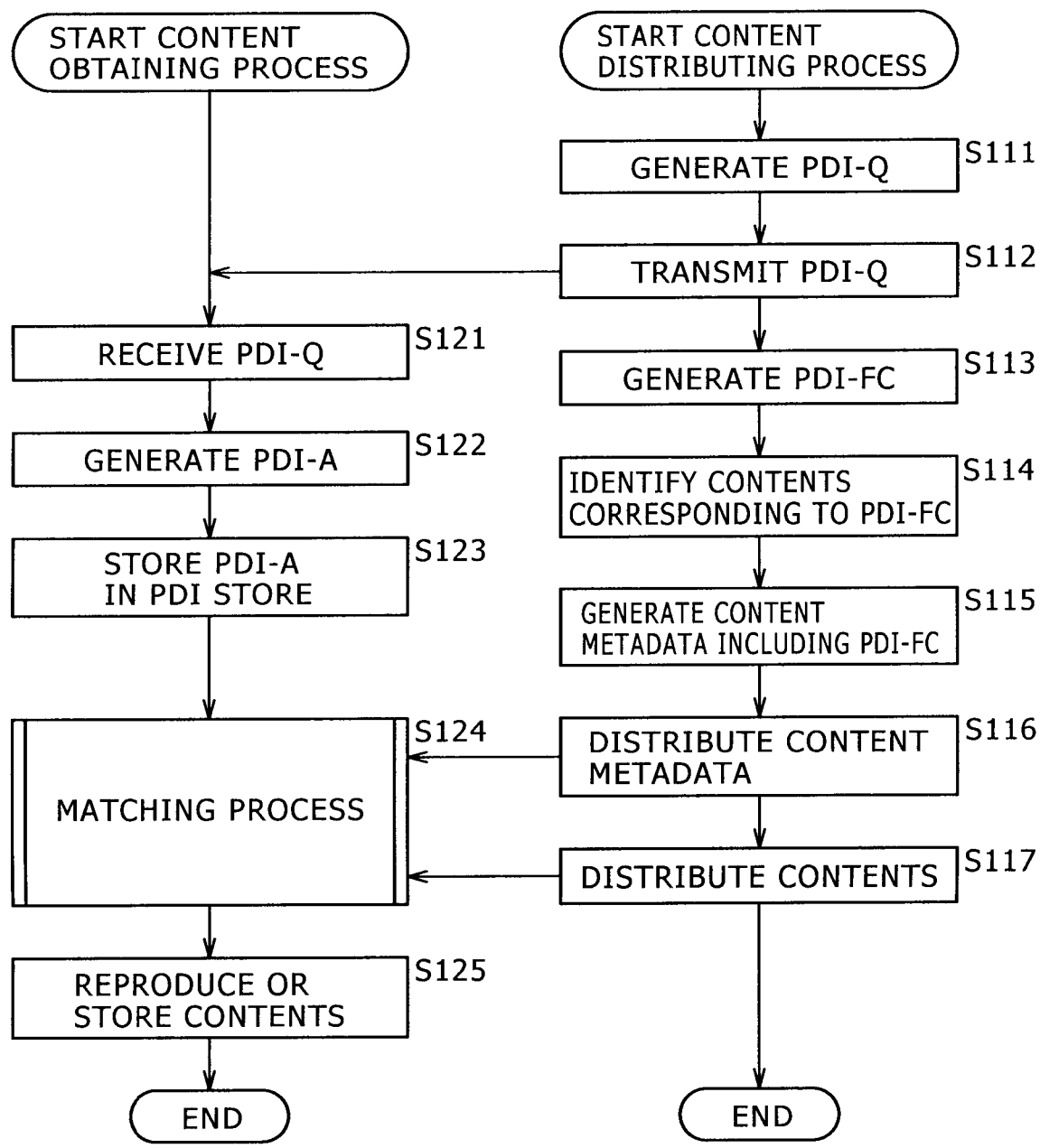
FIG. 19 is a flowchart of assistance in explaining a process of transmitting and receiving contents.

Incidentally, the processes of steps S111, S112, S116, S117, S121 to S123, and S125 in the flowchart of FIG. 19 are basically similar to the processes of steps S11, S12, S16, S17, S21 to S23, and S25 in the flowchart of FIG. 5, and therefore description thereof will be omitted.

Specifically, in step S113, the PDI-FC generator 111 in the server 11 generates a provider side PDI-A for questions defined in the PDI-Q from the PDI-Q generator 41, generates a PDI-FC in which the generated provider side PDI-A is applied to a predetermined conditional statement, and supplies the PDI-FC to the metadata distributor 112. Specifically, when the PDI-Q has been generated by operation of the staff of a broadcasting station (side of a provider), the PDI-FC generator 111 makes screens corresponding to the questions defined in the PDI-Q as described above with reference to FIGS. 8 to 12, for example, displayed on a display section not shown in the figures, and makes the staff of the broadcasting station input or select answers to the questions and further determine a combination of answers (filtering condition), thereby generating the PDI-FC indicating the combination of the answers. At this time, the staff of the broadcasting station input or select answers corresponding to contents to be distributed as answers to the questions defined in the PDI-Q, and further determine a combination. That is, the PDI-FC generated by the PDI-FC generator 111 indicates information (combination of answers) for the side of the provider to take the preferences of the user (viewer) of the client 12 into consideration and have the viewer view the contents to be distributed later.

In step S114, the metadata distributor 112 identifies (refers to) contents corresponding to the PDI-FC from the PDI-FC generator 111 from contents stored in the content storing section 45 on the basis of the PDI-FC. The contents identified in this case may be contents whose content metadata, which is attached to the stored contents in advance, has a higher degree of similarity to the PDI-FC from the PDI-FC generator 111 than a predetermined value, or may be contents selected by the staff of the broadcasting station in advance as contents desired to be viewed by the user. Incidentally, the content distributor 46 obtains the contents identified by the metadata distributor 112 from the content storing section 45.

In step S115, the metadata distributor 112 generates content metadata including the PDI-FC newly on the basis of the content metadata attached in advance to the contents identified in step S114 and the PDI-FC from the PDI-FC generator 111.

Then, in step S124, the content filter 54 of the client 12 performs a matching process. The content filter 54 performs matching for the PDI-A stored in the PDI store 53 on the basis of the PDI-FC included in the content metadata from the server 11, thereby obtaining contents from the server 11.

Suppose in this case that the PDI-A described with reference to FIG. 13 is generated and stored as a user side PDI-A, and that a PDI-FC shown in the following is transmitted from the server 11.

"//QBA[id='Common:111' and a='true'] and //QSA [id='ProviderA:123' and a='Baseball']"

The above-described PDI-FC indicates that evaluation is performed as to whether "true" is selected as an answer to the question of "Common:111" and "Baseball" is selected as an answer to the question of "ProviderA:123" in the user side PDI-A.

At this time, the content filter 54 evaluates the user side PDI-A on the basis of the PDI-FC, and determines that the user side PDI-A and the PDI-FC match each other when the user side PDI-A satisfies the PDI-FC (true), or determines that the user side PDI-A and the PDI-FC do not match each other when the user side PDI-A does not satisfy the PDI-FC (false). In this case, "true" is selected as an answer to the question of "Common:111" and "Baseball" is selected as an answer to the question of "ProviderA:123" in the user side PDI-A shown in FIG. 13. It is thus determined that the user side PDI-A and the PDI-FC match each other.

Details of Matching Process

Figure 20:
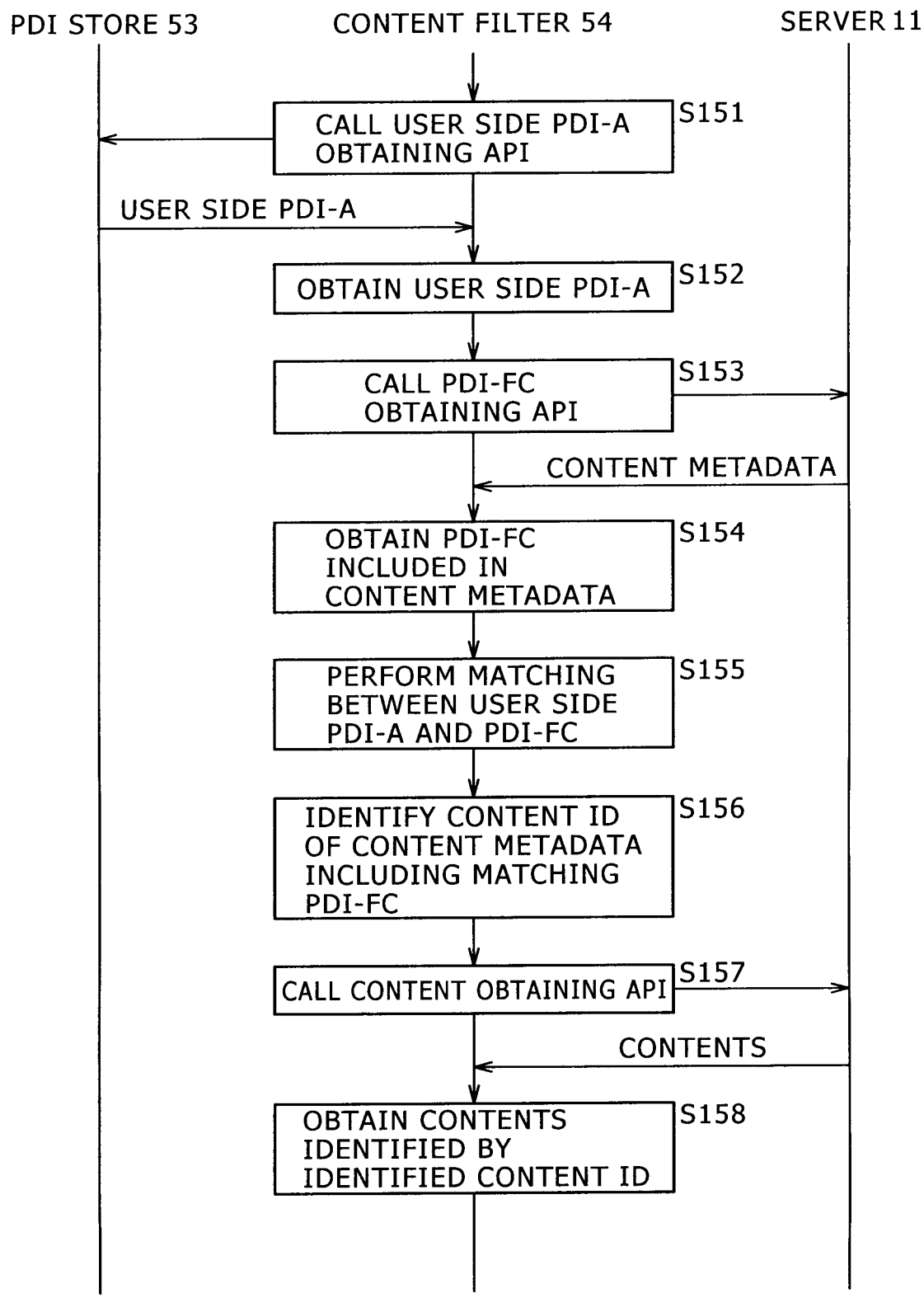
FIG. 20 is a flowchart of assistance in explaining details of a matching process.

Details of the matching process performed in step S124 will next be described in the following with reference to a flowchart of FIG. 20.

First, in step S151, the content filter 54 calls a user side PDI-A obtaining API, which is an API for obtaining the user side PDI-A from the PDI store 53.

In step S152, the content filter 54 obtains the user side PDI-A returned as the output argument of the user side PDI-A obtaining API.

In step S153, the content filter 54 calls a PDI-FC obtaining API, which is an API for obtaining the PDI-FC from the server 11.

The input argument and the output argument of the PDI-FC obtaining API are as follows.

Input argument: a content ID (C_ID)

Output argument: the PDI-FC included in content metadata corresponding to the content ID specified by the input argument The content ID is information for identifying contents, and is associated also with content metadata on the contents. For example, when the input argument is set as C_ID=*, all contents are specified. Thus, when the input argument is set as C_ID=*, the server 11 is requested to distribute content metadata on all the contents, and the PDI-FC included in the content metadata distributed from the server 11 in response to the request is returned as the output argument.

In step S154, the content filter 54 obtains the PDI-FC returned as the output argument of the PDI-FC obtaining API.

In step S155, the content filter 54 performs matching between the user side PDI-A and the PDI-FC by the method described above.

In step S156, the content filter 54 identifies the content ID of the content metadata including the PDI-FC matching the user side PDI-A.

In step S157, the content filter 54 calls a content obtaining API, which is an API for obtaining contents from the server 11.

In step S158, the content filter 54 obtains the contents returned as the output argument of the content obtaining API, and supplies the contents to the content reproducing section 55 or the content storing section 56. The process then returns to step S124 in the flowchart of FIG. 19.

The above description assumes that the user side PDI-A stored in the PDI store 53 is accessed by a file system. However, when the PDI store 53 is configured as a database, the user side PDI-A stored in the PDI store 53 is managed by a database management system (DBMS).

Details of Matching Process

Figure 21:
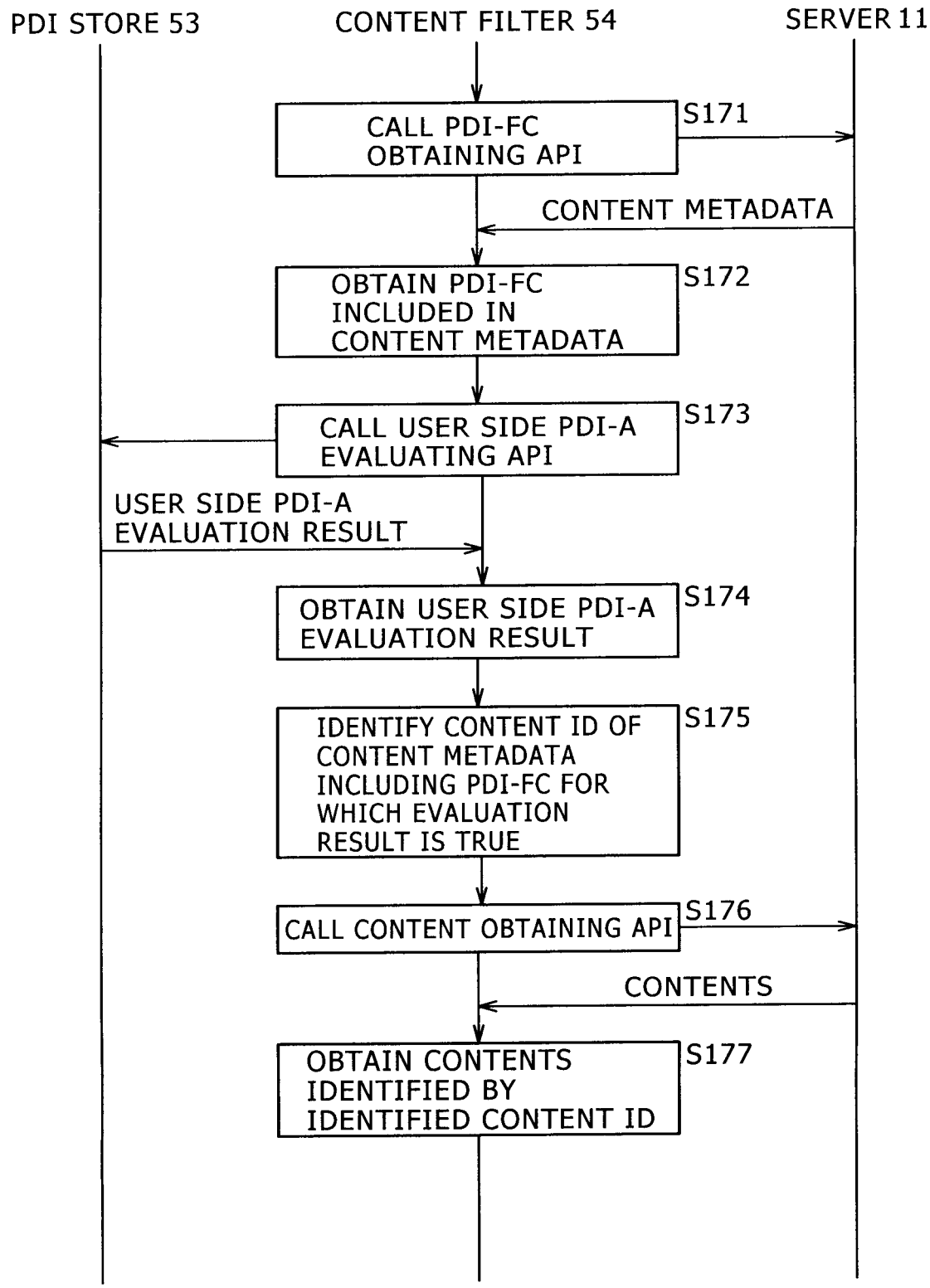
FIG. 21 is a flowchart of assistance in explaining details of the matching process.

Details of a matching process in a case where the PDI store 53 is configured as a database will be described in the following with reference to a flowchart of FIG. 21.

First, in step S171, the content filter 54 calls a PDI-FC obtaining API, which is an API for obtaining a PDI-FC from the server 11.

In step S172, the content filter 54 obtains the PDI-FC returned as the output argument of the PDI-FC obtaining API.

In step S173, the content filter 54 calls a user side PDI-A evaluating API, which is an API for evaluating whether a user side PDI-A corresponding to the PDI-FC from the server 11 is stored in the PDI store 53.

The input argument and the output argument of the user side PDI-A evaluating API are as follows.

Input argument: the PDI-FC

Output argument: a result (true/false) of the evaluation based on the PDI-FC specified by the input argument The PDI-FC is the PDI-FC obtained by the PDI-FC obtaining API. When the user side PDI-A evaluating API passes the PDI-FC to the DBMS managing data in the PDI store 53, the DBMS evaluates the user side PDI-A using the PDI-FC. The result of the evaluation is returned as the output argument.

In step S174, the content filter 54 obtains the result of the user side PDI-A evaluation which result is returned as the output argument of the user side PDI-A evaluating API.

In step S175, the content filter 54 identifies the content ID of content metadata including the provider side PDI-A for which the result of the user side PDI-A evaluation is true.

In step S176, the content filter 54 calls a content obtaining API, which is an API for obtaining contents from the server 11.

In step S177, the content filter 54 obtains the contents returned as the output argument of the content obtaining API.

Thus, when the PDI store 53 is configured as a database, the content filter 54 can perform matching between the user side PDI-A and the PDI-FC by calling the user side PDI-A evaluating API.

As described above, a more complex filtering condition is expressed by the PDI-FC set on the side of the provider. Therefore the user (viewer) expected on the side of the provider can be more surely made to obtain the contents.

Second Example of Matching Process Using Query for Evaluating PDI-A

Next, a configuration in which a user side PDI-A and a provider side PDI-A are compared with each other by expressing the user side PDI-A as a query will be described.

Figure 22:
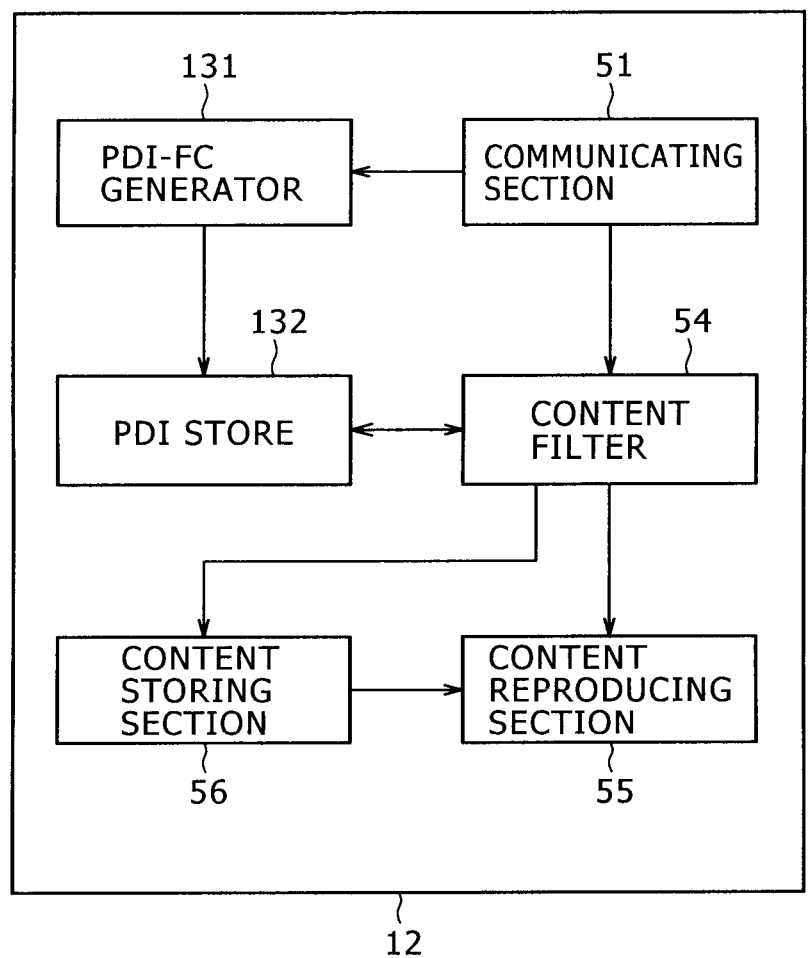
FIG. 22 is a block diagram showing another example of functional configuration of the client.

FIG. 22 shows an example of functional configuration of a client 12 in which a user side PDI-A is expressed as a query.

The client 12 of FIG. 22 includes a communicating section 51, a content filter 54, a content reproducing section 55, a content storing section 56, a PDI-FC generator 131, and a PDI store 132.

Incidentally, in the client 12 of FIG. 22, constitutions having similar functions to those provided in the client 12 of FIG. 4 will be identified by the same names and the same reference numerals, and description thereof will be omitted as appropriate.

Specifically, the client 12 of FIG. 22 is different from the client 12 of FIG. 4 in that the client 12 of FIG. 22 includes the PDI-FC generator 131 and the PDI store 132 in place of the PDI-A generator 52 and the PDI store 53.

The PDI-FC generator 131 generates a user side PDI-A indicating answers of the user of the client 12 to questions about the preferences of the user, the user side PDI-A corresponding to a PDI-Q transmitted from a server 11, on the basis of the PDI-Q, generates a PDI-FC in which the generated user side PDI-A is applied to a predetermined conditional statement, and supplies the PDI-FC to the PDI store 132.

The PDI store 132 stores the PDI-FC from the PDI-FC generator 131. The PDI-FC stored in the PDI store 132 is accessed by a file system, and is read out to the content filter 54 as required.

Incidentally, the content filter 54 in FIG. 22 reads the PDI-FC from the PDI store 53, and filters contents on the basis of the PDI-FC and the provider side PDI-A included in content metadata transmitted from the server 11.

The server 11 in this example is identical to the server 11 of FIG. 3, and therefore description thereof will be omitted.

A process of transmitting and receiving contents in a broadcasting system 10 including the client 12 of FIG. 22 will next be described with reference to a flowchart of FIG. 23.

Figure 23:
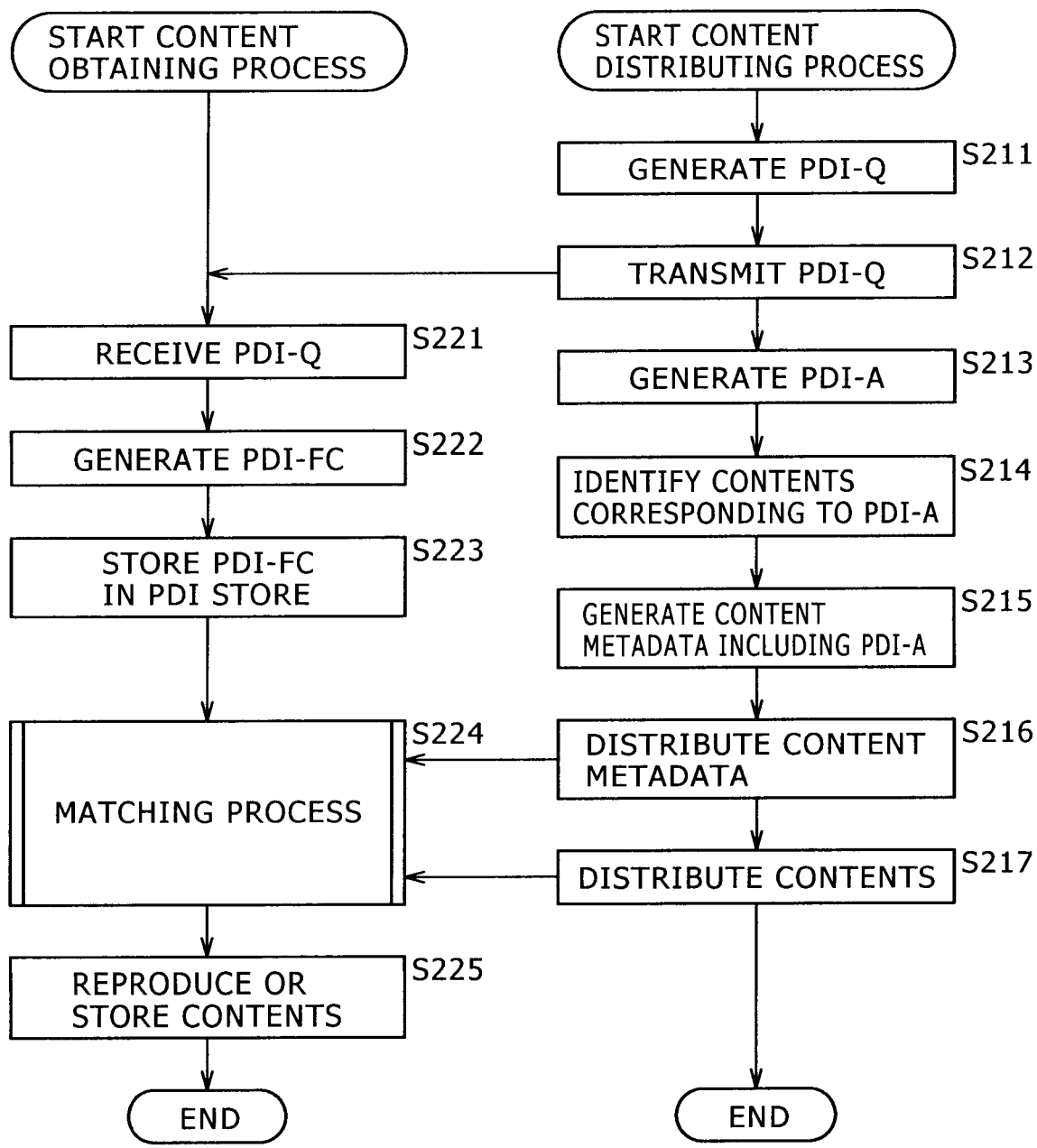
FIG. 23 is a flowchart of assistance in explaining a process of transmitting and receiving contents.

Incidentally, the processes of steps S211 to S221 and S225 in the flowchart of FIG. 23 are basically similar to the processes of steps S11 to S21 and S25 in the flowchart of FIG. 5, and therefore description thereof will be omitted.

Specifically, in step S222, the PDI-FC generator 131 in the client 12 generates a user side PDI-A for questions defined in the PDI-Q received in the communicating section 51, and generates a PDI-FC in which the generated user side PDI-A is applied to a predetermined conditional statement. Specifically, for example, when the PDI-Q from a broadcasting station has been received, the PDI-FC generator 131 makes screens corresponding to the questions described above with reference to FIGS. 8 to 12 displayed on a display section not shown in the figures, and makes the user (viewer) of the client 12 input or select answers to the questions and further makes the user determine a combination of answers (filtering condition), thereby generating the PDI-FC indicating the combination of the answers. That is, the PDI-FC generator 131 generates the PDI-FC indicating the combination of the answers to the questions defined in the PDI-Q by interacting with the user.

In step S223, the PDI-FC generator 131 stores the generated PDI-FC in the PDI store 132.

Then, in step S224, the content filter 54 performs a matching process. The content filter 54 performs matching for the provider side PDI-A included in the content metadata from the server 11 on the basis of the PDI-FC stored in the PDI store 132, thereby obtaining contents from the server 11.

Suppose in this case that the PDI-A described with reference to FIG. 14 is transmitted as the provider side PDI-A from the server 11, and that a PDI-FC shown in the following is generated and stored.

"//QBA[id='Common:111' and a='false'] and //QSA [id='ProviderA:123' and a='Baseball']"

The above-described PDI-FC indicates that evaluation is performed as to whether "false" is selected as an answer to the question of "Common:111" and "Baseball" is selected as an answer to the question of "ProviderA:123" in the provider side PDI-A.

At this time, the content filter 54 evaluates the provider side PDI-A on the basis of the PDI-FC, and determines that the provider side PDI-A and the PDI-FC match each other when the provider side PDI-A satisfies the PDI-FC (true), or determines that the provider side PDI-A and the PDI-FC do not match each other when the provider side PDI-A does not satisfy the PDI-FC (false). In this case, "false" is selected as an answer to the question of "Common:111" and "Baseball" is selected as an answer to the question of "ProviderA:123" in the provider side PDI-A shown in FIG. 14. It is thus determined that the provider side PDI-A and the PDI-FC match each other.

Details of Matching Process

Figure 24:
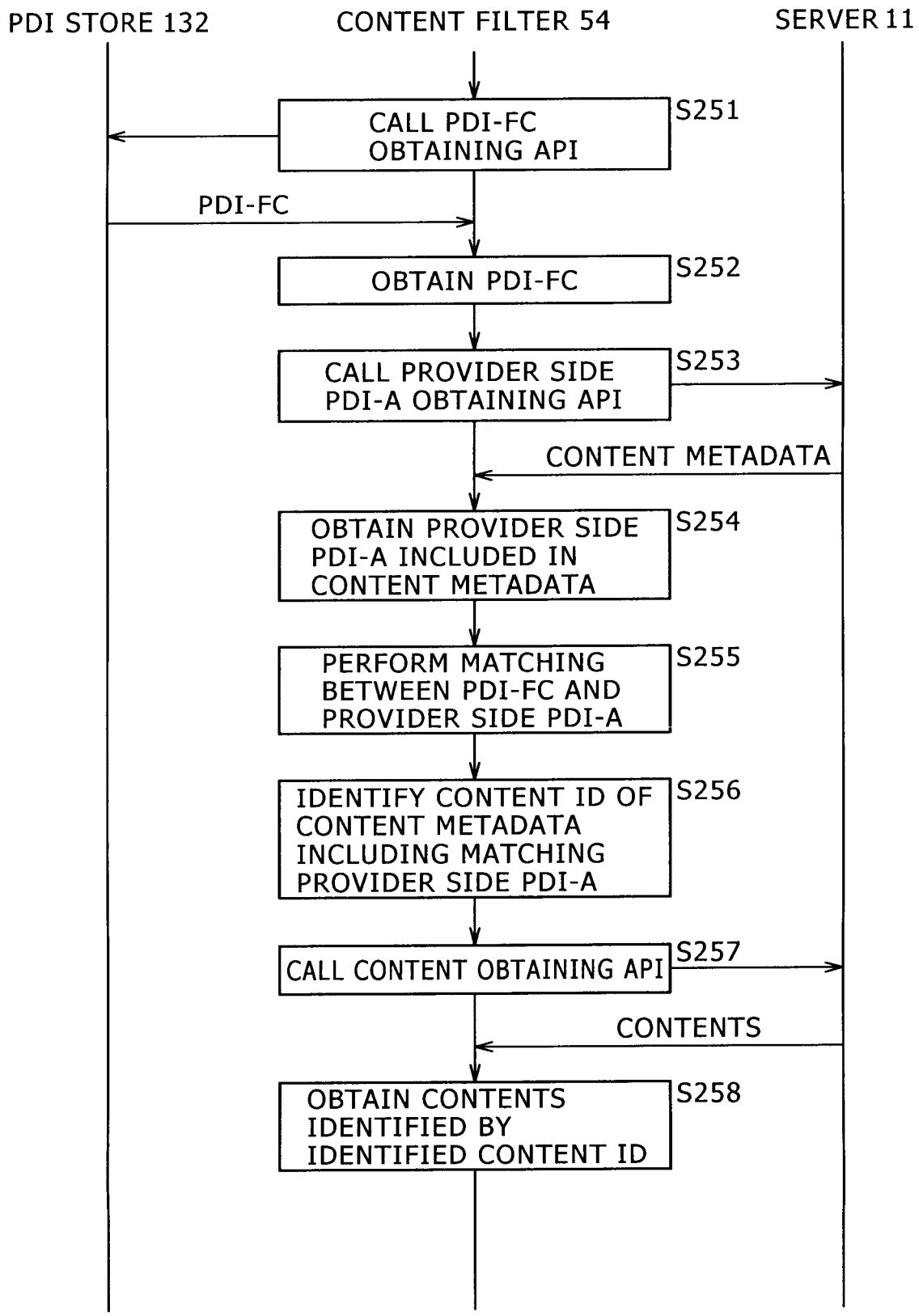
FIG. 24 is a flowchart of assistance in explaining details of a matching process.

Details of the matching process performed in step S224 will next be described in the following with reference to a flowchart of FIG. 24.

First, in step S251, the content filter 54 calls a PDI-FC obtaining API, which is an API for obtaining the PDI-FC from the PDI store 53.

The input argument and the output argument of the PDI-FC obtaining API are as follows.

Input argument: none

Output argument: PDI-FCs stored in the PDI store 132

That is, when the PDI-FC obtaining API is called, all PDI-FCs stored in the PDI store 132 are returned as the output argument.

In step S252, the content filter 54 obtains the PDI-FC returned as the output argument of the PDI-FC obtaining API.

In step S253, the content filter 54 calls a provider side PDI-A obtaining API, which is an API for obtaining the provider side PDI-A from the server 11.

In step S254, the content filter 54 obtains the provider side PDI-A returned as the output argument of the provider side PDI-A obtaining API.

In step S255, the content filter 54 performs matching between the PDI-FC and the provider side PDI-A by the method described above.

In step S256, the content filter 54 identifies the content ID of the content metadata including the provider side PDI-A matching the PDI-FC.

In step S257, the content filter 54 calls a content obtaining API, which is an API for obtaining contents from the server 11.

In step S258, the content filter 54 obtains the contents returned as the output argument of the content obtaining API, and supplies the contents to the content reproducing section 55 or the content storing section 56. The process then returns to step S224 in the flowchart of FIG. 23.

The above description assumes that the PDI-FC stored in the PDI store 132 is accessed by a file system. However, when the PDI store 132 is configured as a database, the PDI-FC stored in the PDI store 132 is managed by a database management system (DBMS).

Details of Matching Process

Figure 25:
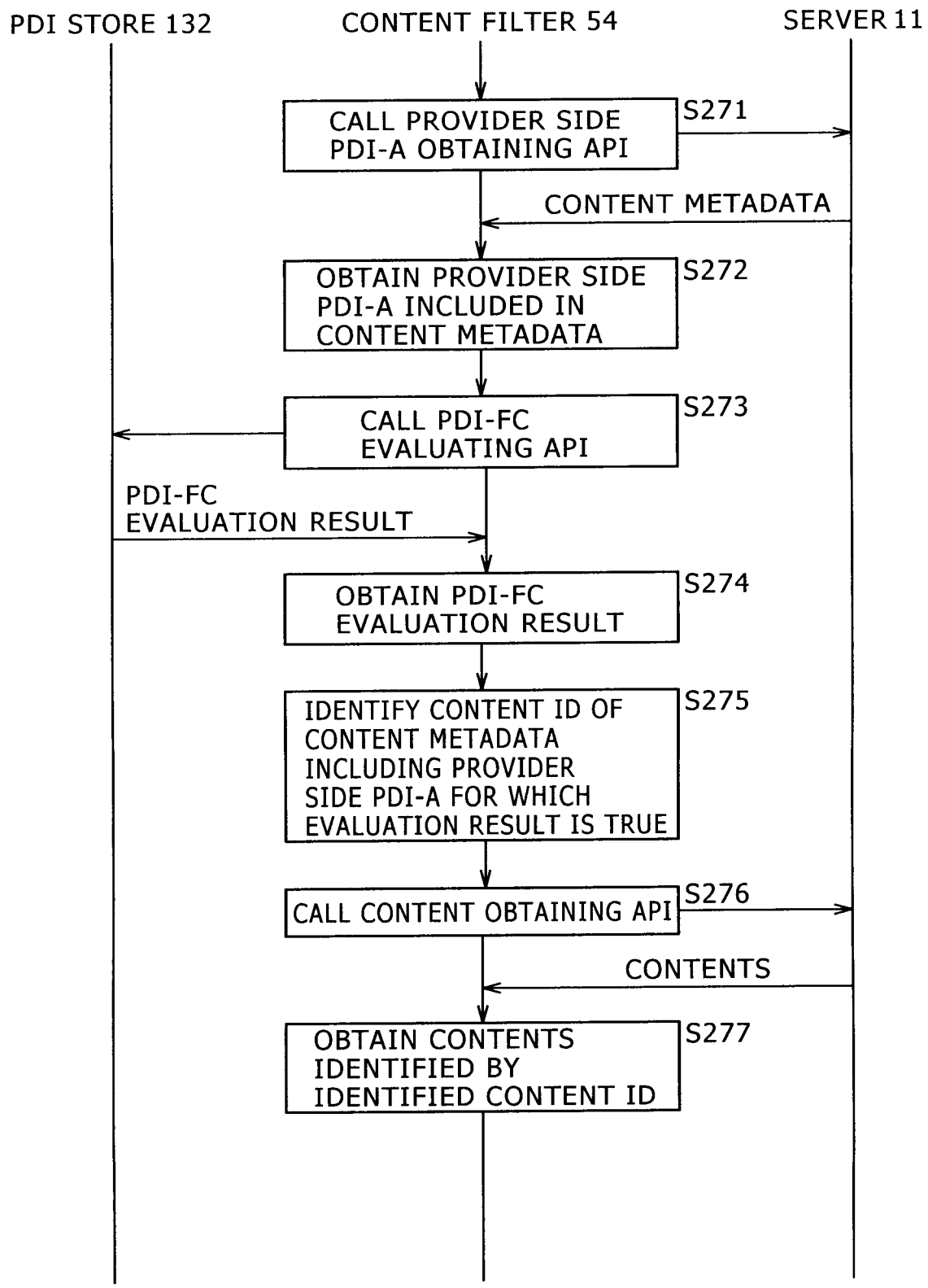
FIG. 25 is a flowchart of assistance in explaining details of the matching process.

Details of a matching process in a case where the PDI store 132 is configured as a database will be described in the following with reference to a flowchart of FIG. 25.

First, in step S271, the content filter 54 calls a provider side PDI-A obtaining API, which is an API for obtaining the provider side PDI-A from the server 11.

In step S272, the content filter 54 obtains the provider side PDI-A returned as the output argument of the provider side PDI-A obtaining API.

In step S273, the content filter 54 calls a PDI-FC evaluating API, which is an API for evaluating whether a PDI-FC corresponding to the provider side PDI-A from the server 11 is stored in the PDI store 132.

The input argument and the output argument of the PDI-FC evaluating API are as follows.

Input argument: the provider side PDI-A

Output argument: a result (true/false) of the evaluation as to whether a PDI-FC corresponding to the provider side PDI-A specified by the input argument is stored Incidentally, the provider side PDI-A is the provider side PDI-A obtained by the provider side PDI-A obtaining API. When the PDI-FC evaluating API passes the provider side PDI-A to the DBMS managing data in the PDI store 132, the DBMS evaluates the provider side PDI-A using the PDI-FC stored in the PDI store 132. On the basis of a result of the evaluation, the result of the evaluation as to whether a PDI-FC corresponding to the provider side PDI-A is stored is returned as the output argument.

In step S274, the content filter 54 obtains the result of the PDI-FC evaluation which result is returned as the output argument of the PDI-FC evaluating API.

In step S275, the content filter 54 identifies the content ID of the content metadata including the provider side PDI-A for which the result of the PDI-FC evaluation is true.

In step S276, the content filter 54 calls a content obtaining API, which is an API for obtaining contents from the server 11.

In step S277, the content filter 54 obtains the contents returned as the output argument of the content obtaining API.

Thus, when the PDI store 132 is configured as a database, the content filter 54 can perform matching between the PDI-FC and the provider side PDI-A by calling the PDI-FC evaluating API.

As described above, a more complex filtering condition is expressed by the PDI-FC set on the side of the user. Therefore the contents expected on the side of the user can be more surely obtained.

The present technology is applicable to a broadcasting system for broadcasting digital television programs. As an example, the present technology is applicable to a broadcasting system for performing broadcasting by an ATSC-M/H (Mobile/Handheld) system, which is an extension of the ATSC (Advanced Television Standard Committee) system to mobile reception.

Figure 26:
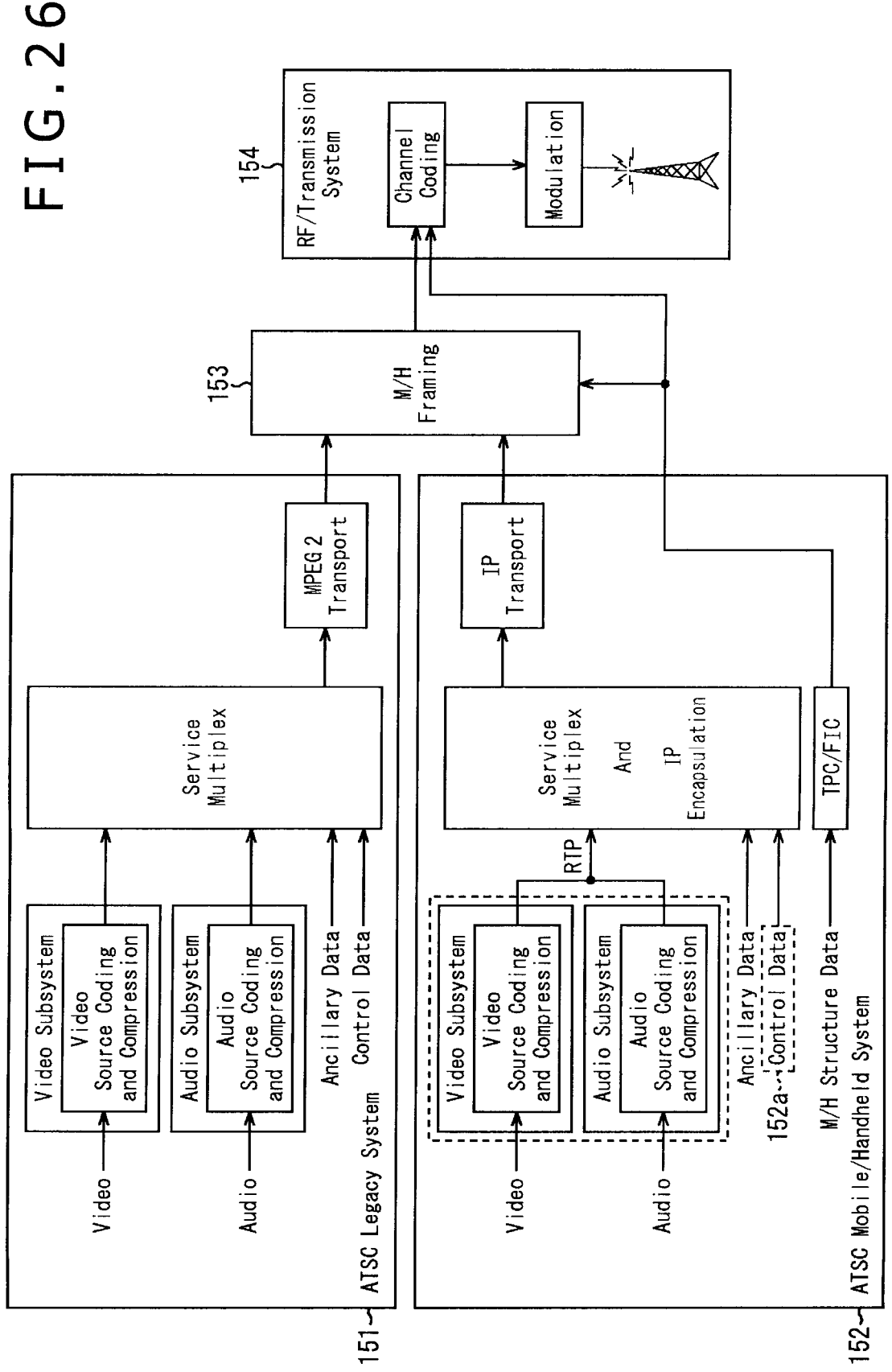
FIG. 26 is a block diagram showing an example of configuration of a broadcasting system for performing broadcasting by the ATSC-M/H system, to which broadcasting system the present technology is applied.

Example of Application to Broadcasting System for Broadcasting by ATSC-M/H System FIG. 26 is a diagram showing an example of configuration of a broadcasting system for broadcasting a digital television program by each of the conventional ATSC system and ATSC-M/H, to which broadcasting system the present technology is applied.

The broadcasting system of FIG. 26 corresponds to the server 11 in the broadcasting system 10 of FIG. 1, and includes an ATSC Legacy System 151, an ATSC M/H System 152, an M/H Framing 153, and an RF/Transmission System 154.

The ATSC Legacy System 151 sends out a broadcast stream by MPEG2-TS (Moving Picture Experts Group 2 Transport System) by the conventional ATSC system. The ATSC M/H System 152 sends out a broadcast stream of IP packets by the ATSC-M/H system. Control Data 152a in the ATSC M/H System 152 is control information on the broadcast stream (A/V (Audio/Video) contents) sent out from the ATSC M/H System 152.

The broadcast streams described above are each multiplexed by the M/H Framing 153, and then transmitted as broadcast waves by the RF/Transmission System 154. Incidentally, details of functions of the respective blocks are described in the ATSC standard, and therefore description thereof will be omitted in the following.

Figure 27:
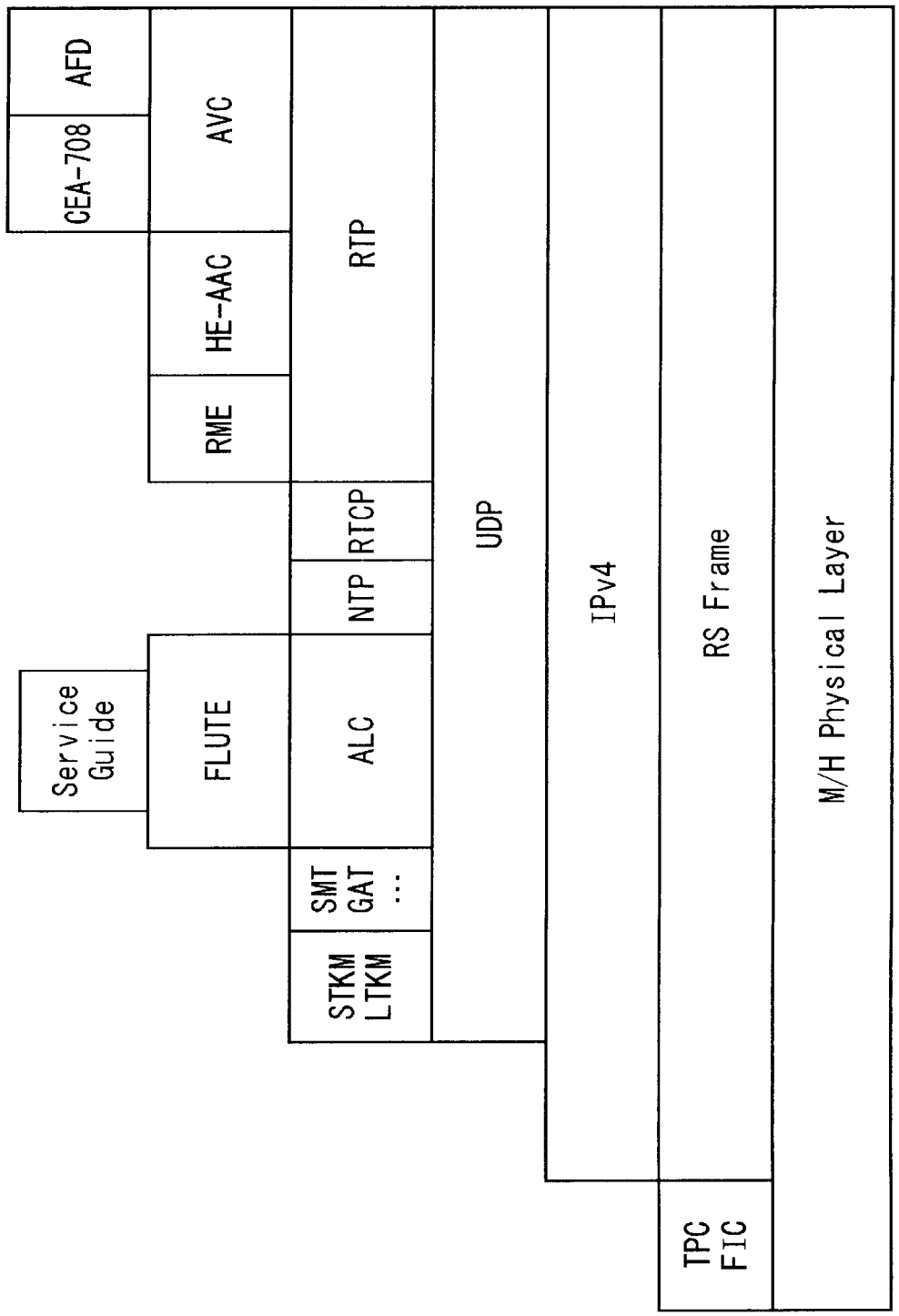
FIG. 27 is a diagram showing a protocol stack in a broadcast wave signal transmitted by the ATSC-M/H system.

FIG. 27 shows a protocol stack in a broadcast wave signal transmitted by the ATSC-M/H system.

Though not described in detail, one of highest layers is "Service Guide," and defines the metadata of contents provided by the ATSC-M/H system. The Control Data 152a shown in FIG. 26 is transmitted as content metadata defined in the "Service Guide" (hereinafter referred to simply as Service Guide). That is, in the broadcasting system of FIG. 26, the PDI-A (provider side PDI-A), the PDI-FC, and the PDI-Q transmitted from the server 11 to the client 12 in the above-described broadcasting system 10 are stored and transmitted in the Service Guide.

Incidentally, in FIG. 27, a lower layer "FLUTE" adjacent to the "Service Guide" and a lower layer "ALC" adjacent to "FLUTE" are layers for transferring the Service Guide packetized by UDP/IP (User Datagram Protocol/Internet Protocol).

Figure 28:
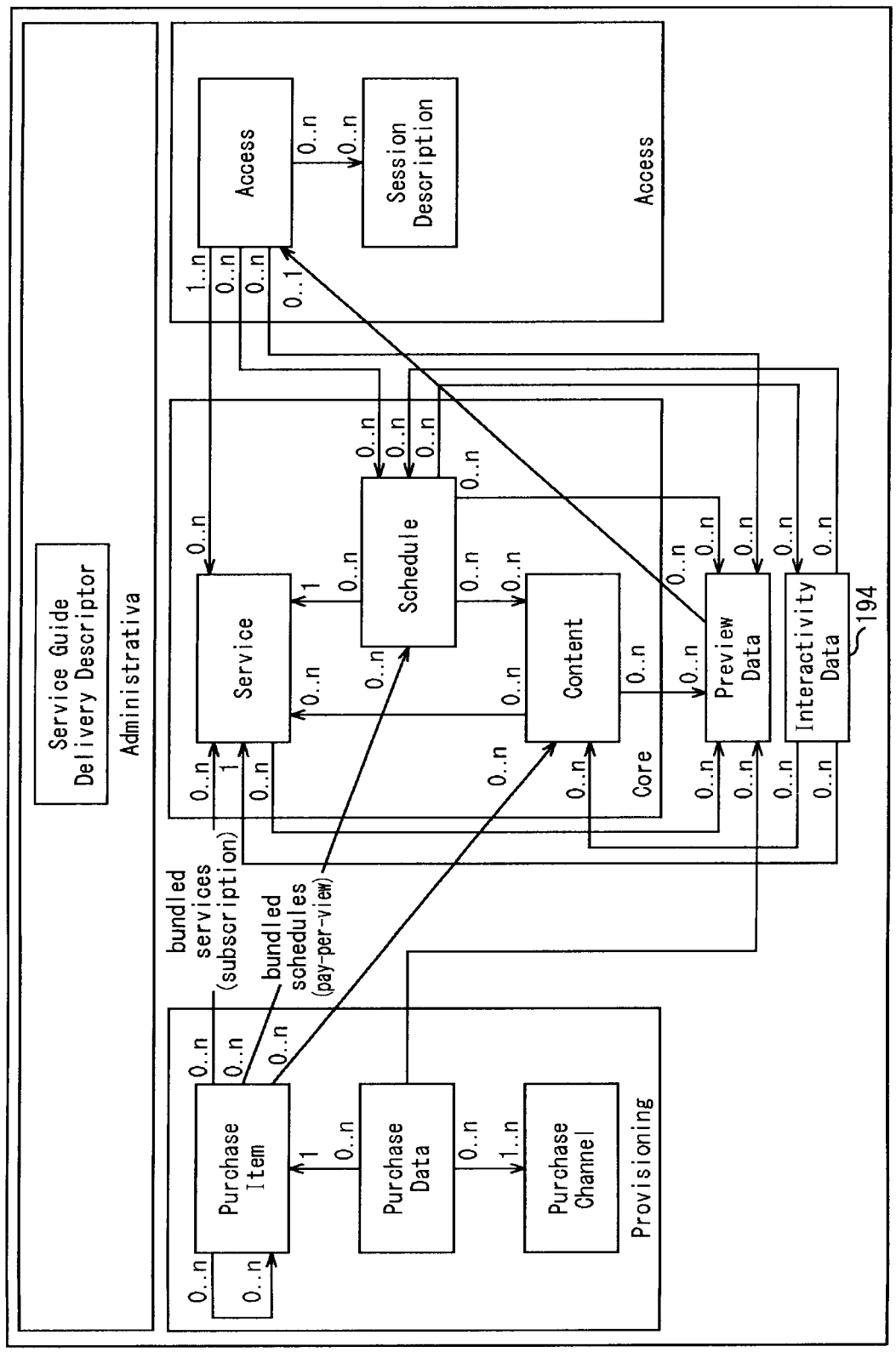
FIG. 28 is a diagram showing a data configuration of Service Guide.

As specifications of the Service Guide, a data configuration shown in FIG. 28 is defined by OMA (Open Mobile Alliance). Incidentally, details of the configuration of the Service Guide shown in FIG. 28 are defined in "'Service Guide for Mobile Broadcast Services,' Open Mobile Alliance, OMA-TSBCAST_ServiceGuide-V1_0, Candidate Version 1.0," and therefore description thereof will be omitted.

The PDI-A (provider side PDI-A) or the PDI-FC is stored in at least one of a "Service" fragment, a "Schedule" fragment, and a "Content" fragment among elements forming the Service Guide shown in FIG. 28.

The "Service" fragment is metadata including control information on the contents of a channel service. FIG. 29 shows details of a configuration thereof. The PDI-A or the PDI-FC is stored in a "PDI-FC" element, for example, newly added to a "PrivateExt" element defined in a lowermost section in the "Service" fragment shown in FIG. 29. Specifically, for example, the "PDI-FC" element is expressed in a character string as <xs:element name="PDI-FC" type="xs:string" xmlns:xs="http://www.w3.org/2001/XMLSchema"/> by XML schema, and encoded.

The "Schedule" fragment is metadata including control information on a schedule for distribution of contents (digital television programs). FIG. 30 shows details of a configuration thereof. The PDI-A or the PDI-FC is stored in a "PDI-FC" element, for example, newly added to a "PrivateExt" element defined in a lowermost section in the "Schedule" fragment shown in FIG. 30. Specifically, for example, the "PDI-FC" element is expressed in a character string as <xs:element name="PDI-FC" type="xs:string" xmlns:xs="http://www.w3.org/2001/XMLSchema"/> by XML schema, and encoded.

The "Content" fragment is metadata including control information on contents of contents (digital television programs). FIG. 31 shows details of a configuration thereof.

The PDI-A or the PDI-FC is stored in a "PDI-FC" element, for example, newly added to a "PrivateExt" element defined in a lowermost section in the "Content" fragment shown in FIG. 31. Specifically, for example, the "PDI-FC" element is expressed in a character string as <xs:element name="PDI-FC" type="xs:string" xmlns:xs="http://www.w3.org/2001/XMLSchema"/> by XML schema, and encoded.

In addition, the PDI-Q is stored in an "Interactivity Data" fragment among the elements forming the Service Guide shown in FIG. 28.

Figure 32:
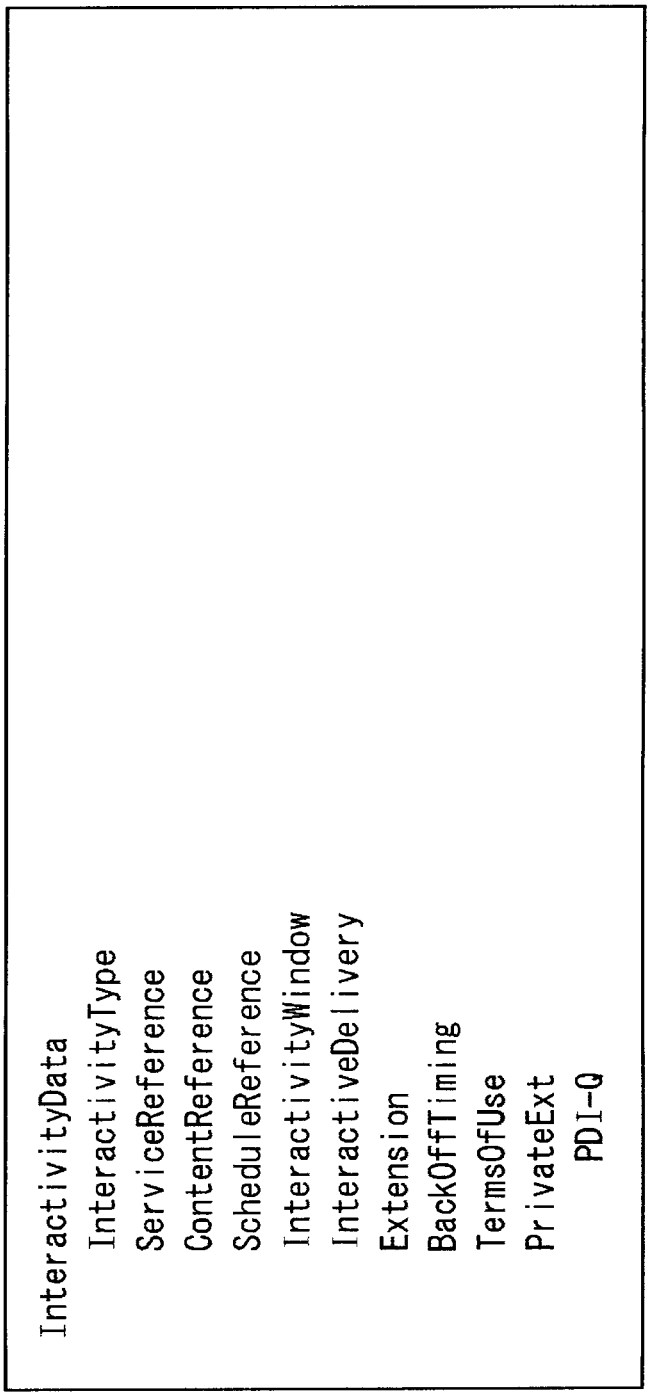
FIG. 32 is a diagram of assistance in explaining a configuration of an Interactivity Data fragment.

The "Interactivity Data" fragment is metadata on applications related to channel service and contents (television programs). FIG. 32 shows details of a configuration thereof. The PDI-Q is stored in a "PDI-Q" element, for example, newly added to a "PrivateExt" element defined in a lowermost section in the "Interactivity Data" fragment shown in FIG. 32. Specifically, for example, the "PDI-Q" element is expressed in a character string as <xs:element name="PDI-Q" type="xs:string" xmlns:xs="http://www.w3.org/2001/XMLSchema"/> by XML schema, and encoded.

The above description has been made of an example in which the present technology is applied to a broadcasting system for performing broadcasting by the ATSC-M/H system. However, the present technology is also applicable to a broadcasting system for performing NRT (Non-Real Time) broadcasting by the conventional ATSC system. The NRT broadcasting does not assume real-time viewing of contents, and does not require that contents be reproduced in synchronism with the time of broadcasting of the contents broadcast as data by a broadcast signal.

Example of Application to Broadcasting System for NRT Broadcasting

Figure 33:
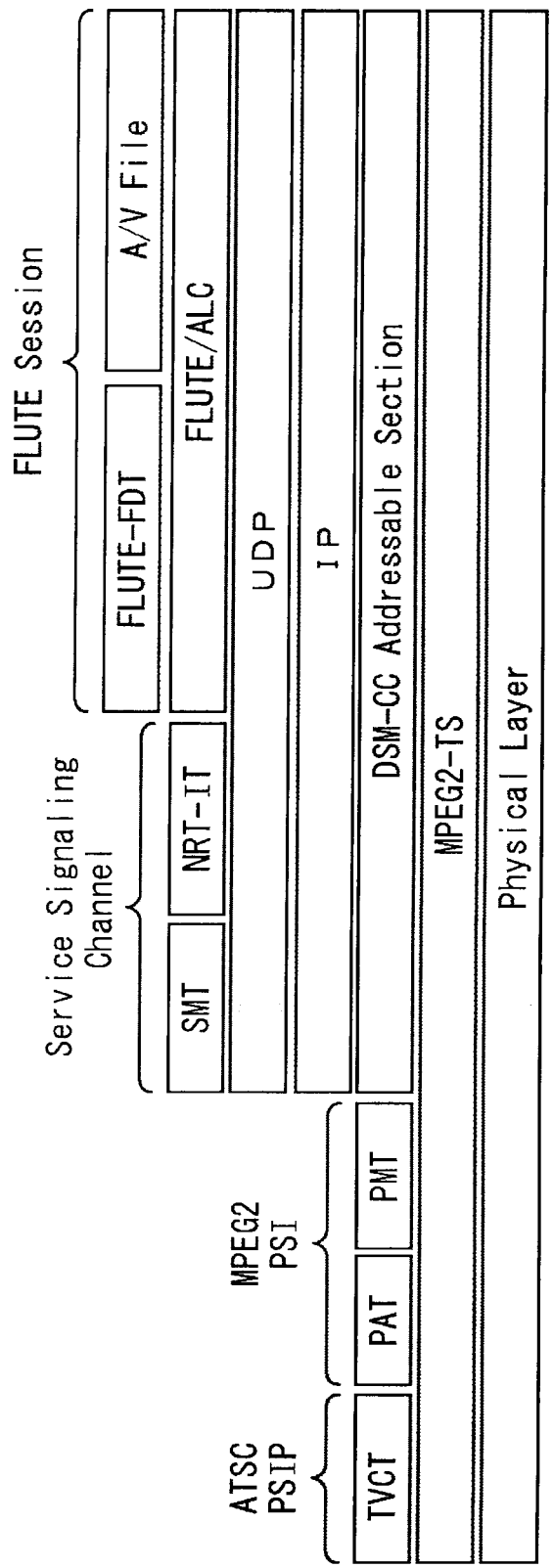
FIG. 33 is a diagram showing a protocol stack in a broadcast wave signal transmitted by NRT broadcasting.

FIG. 33 shows a protocol stack in a broadcast wave signal transmitted by NRT broadcasting.

Though not described in detail, a lowest layer is "Physical Layer," and the frequency band of broadcast waves corresponds to this layer. A higher layer adjacent to the "Physical Layer" is "MPEG2-TS," and a broadcast stream broadcast as broadcast waves corresponds to this layer.

"ATSC-PSIP (Program and System Information Protocol)" and "MPEG2-PSI (Program Specific Information)" are shown as higher layers adjacent to the "MPEG2-TS." The "ATSC-PSIP" is a layer having TVCT. The "MPEG2-PSI" is a layer having PAT (Program Association Table) and PMT (Program Map Table).

In addition, "DSM-CC (Digital Storage Media Command and Control) Addressable Section" is shown as a higher layer adjacent to the "MPEG2-TS." The "DSM-CC Addressable Section" is used as an adaptation layer for transferring IP packets on the MPEG2-TS of a broadcast stream.

Figure 34:
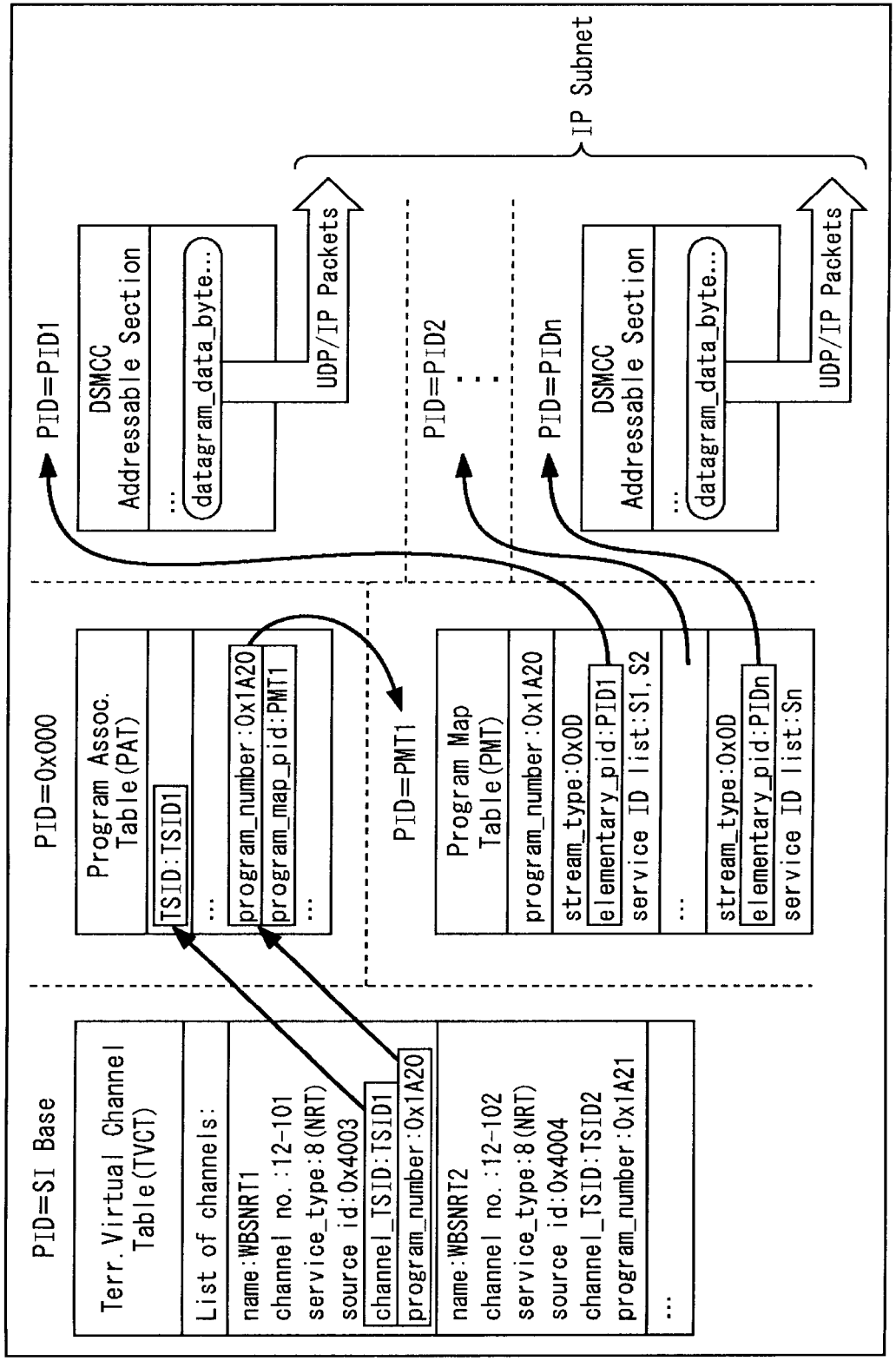
FIG. 34 is a diagram showing a data structure of TVCT, PAT, PMT, and DSM-CC Addressable Section.

FIG. 34 shows a data structure of the TVCT, the PAT, the PMT, and the DSM-CC Addressable Section. In the TVCT, control information on the broadcast stream broadcast by MPEG2-TS is described. The MPEG2-TS that transfers the DSM-CC Addressable Section for transferring an IP packet stream (UPD/IP Packets) is identified on the basis of the TVCT.

Returning to FIG. 33, "IP" is shown as a higher layer adjacent to the "DSM-CC Addressable Section," and "UDP" is shown as a higher layer adjacent to the "IP."

"Service Signaling Channel" and "FLUTE/ALC (File Delivery over Unidirectional Transport/Asynchronous Layered Coding Protocol)" are shown as higher layers adjacent to the "UDP." The "Service Signaling Channel" is a layer having SMT (Service Map Table) and NRT-IT (NRT Information Table). "FLUTE Session" is shown as a higher layer adjacent to the "FLUTE/ALC." The "FLUTE Session" is a layer having FLUTE-FDT (File Delivery Table) and A/V File (A/V file).

Figure 35:
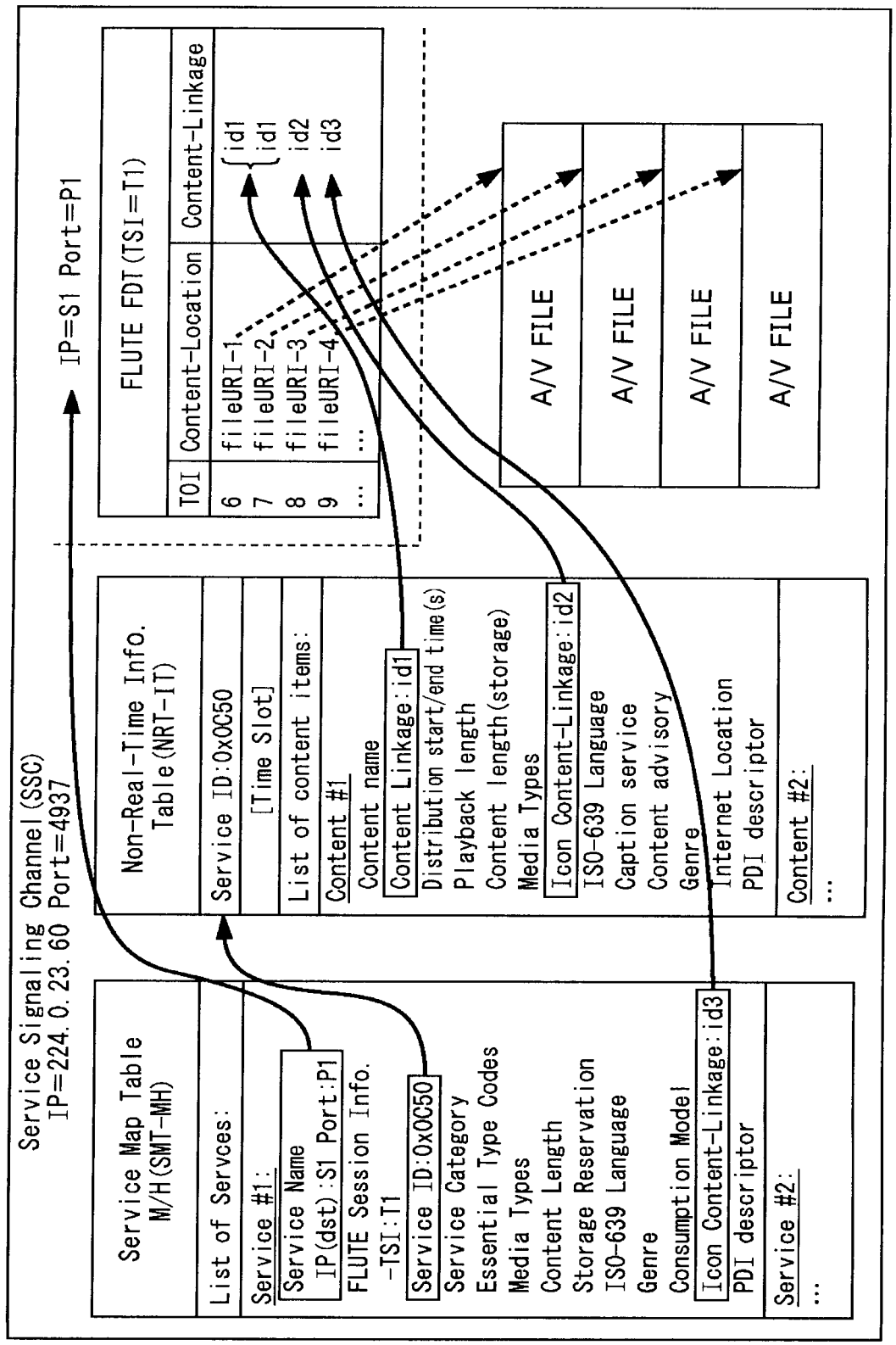
FIG. 35 is a diagram showing a data structure of SMT, NRT-IT, and FLUTE FDT.

FIG. 35 shows a data structure of the SMT, the NRT-IT, and the FLUTE FDT. In the SMT, metadata on channels is described. In the NRT-IT, metadata on contents is described. The SMT and the NRT-IT are transferred by the above-described "Service Signaling Channel." In the FLUTE FDT, information for identifying each A/V file is described. Incidentally, A/V files are transferred by the above-described "FLUTE/ALC."

In the broadcasting system for performing NRT broadcasting, the PDI-A (provider side PDI-A), the PDI-FC, and the PDI-Q transmitted from the server 11 to the client 12 in the above-described broadcasting system 10 are stored and transmitted in the SMT or the NRT-IT.

That is, in a case where distributed contents are filtered in units of channels (broadcasting stations), a "PDI descriptor" for storing the PDI-A, the PDI-FC, or the PDI-Q is newly defined in a descriptor loop (in a lowermost section of "Service #1" in the figure) of the service level of the SMT.

In addition, in a case where distributed contents are filtered in content units, a "PDI descriptor" for storing the PDI-A, the PDI-FC, or the PDI-Q is newly defined in a descriptor loop (in a lowermost section of "Content #1" in the figure) of the service level of the NRT-IT.

FIG. 36 shows an example of the syntax of a "PDI descriptor." Each of descriptors described in FIG. 36 is defined together with a number of bits (No. of Bits) and a format (Format).

According to the syntax shown in FIG. 36, the PDI-A, the PDI-FC, or the PDI-Q is described in a descriptor "PDI Q or PDI A or PDI FC" as variable bits.

It is to be noted that the syntax of the "PDI descriptor" is not limited to the example shown in FIG. 36.

Thus, the present technology is applicable also to a broadcasting system for performing NRT broadcasting.

It is to be noted that the present technology may of course be applied also to a broadcasting system for performing broadcasting by the ATSC-M/H system described above and a broadcasting system for performing NRT broadcasting by a system other than row broadcasting systems.

The series of processes described above can be not only carried out by hardware but also carried out by software. When the series of processes is to be carried out by software, a program constituting the software is installed from a program recording medium onto a computer incorporated in dedicated hardware or a general-purpose personal computer, for example, that can perform various kinds of functions by installing various kinds of programs thereon.

As shown in FIG. 2, the program recording medium storing the program to be installed on the computer and set in a state of being executable by the computer is formed by the removable media 31 as packaged media including a magnetic disk (including a flexible disk), an optical disk (including a CD-ROM (Compact Disc-Read Only Memory) and a DVD (Digital Versatile Disc)), and a magneto-optical disk, a semiconductor memory, or the like, or the ROM 22, the hard disk forming the storage section 28, or the like, which stores the program temporarily or permanently. The program is stored onto the program recording medium using a wire or wireless communication medium such as a local area network, the Internet, digital satellite broadcasting, or the like via the communicating section 29 as an interface such as a router, a modem, or the like as the occasion demands.

It is to be noted that in the present specification, the steps describing the program stored on the program recording medium include not only processes performed in time series in the described order but also processes not necessarily performed in time series but performed in parallel or individually.

In addition, in the present specification, a system refers to an apparatus as a whole formed by a plurality of devices.

It is to be noted that embodiments of the present technology are not limited to the foregoing embodiments, and that various changes can be made without departing from the spirit of the present technology.

What is claimed is:

1. An information processing device for obtaining content, the information processing device comprising:
    circuitry configured to:
        receive audio/video (AV) content via a broadcast signal;
        receive from a provider of the AV content, provider-side preference, demographic or interest (PDI) information, the provider-side PDI information being associated with further content;
        obtain user-side PDI information;
        determine whether the provider-side PDI information and the user-side PDI information match;
        store the further content when the provider-side PDI information and the user-side PDI information are determined to match, including calling at least one application programming interface (API); and
        reproduce the further content on a display.

2. The information processing device according to claim 1, wherein the circuitry is configured to obtain the user-side PDI information by:
    obtaining question information from the provider;
    presenting to a user a question based on the question information; and
    receiving an answer by the user to the question,
    wherein the provider-side PDI information includes an answer by the provider to the question and the user-side PDI information includes the answer by the user to the question.

3. The information processing device according to claim 1 comprising:
    storage configured to store the user-side PDI information,
    wherein the circuitry is configured to call a user-side PDI information obtaining API to obtain the user-side PDI information from the storage.

4. The information processing device according to claim 1, wherein the circuitry is configured to call a provider-side PDI information obtaining API to obtain the provider-side PDI information from a server.

5. The information processing device according to claim 1, wherein the circuitry is configured to receive the provider-side PDI information via the broadcast signal.

6. The information processing device according to claim 1, wherein the circuitry is configured to call a content obtaining API to obtain the further content.

7. The information processing device according to claim 1, wherein the circuitry is configured to obtain the further content from a server via a network.

8. The information processing device according to claim 1, wherein the information processing device is a television.

9. An information processing method of an information processing device for obtaining content, the information processing method comprising:
    receiving audio/video (AV) content via a broadcast signal;
    receiving from a provider of the AV content, provider-side preference, demographic or interest (PDI) information, the provider-side PDI information being associated with further content;
    obtaining user-side PDI information;
    determining, by circuitry of the information processing device, whether the provider-side PDI information and the user-side PDI information match;
    storing, by the circuitry, the further content when the provider-side PDI information and the user-side PDI information are determined to match, including calling at least one application programming interface (API); and
    reproducing the further content on a display.

10. The information processing method according to claim 9, wherein the obtaining the user-side PDI information comprises:
    obtaining question information from the provider;
    presenting to a user a question based on the question information; and
    receiving an answer by the user to the question,
    wherein the provider-side PDI information includes an answer by the provider to the question and the user-side PDI information includes the answer by the user to the question.

11. The information processing method according to claim 9, wherein the obtaining the user-side PDI information comprises:
    calling a user-side PDI information obtaining API to obtain the user-side PDI information from a storage that is configured to store the user-side PDI information.

12. The information processing method according to claim 9, wherein the receiving from the provider of the AV content the provider-side PDI information comprises:
    calling a provider-side PDI information obtaining API to obtain the provider-side PDI information from a server.

13. The information processing method according to claim 9, wherein the receiving from the provider of the AV content the provider-side PDI information comprises:
    receiving the provider-side PDI information via the broadcast signal.

14. The information processing method according to claim 9, wherein the storing the further content comprises:
    calling a content obtaining API to obtain the further content.

15. The information processing method according to claim 9, wherein the storing the further content comprises:
    obtaining the further content from a server via a network.

16. The information processing method according to claim 9, wherein the information processing device is a television.

17. A non-transitory computer-readable medium storing instructions which when executed by a computer cause the computer to perform an information processing method for obtaining content, the information processing method comprising:
    receiving audio/video (AV) content via a broadcast signal;
    receiving from a provider of the AV content, provider-side preference, demographic or interest (PDI) information, the provider-side PDI information being associated with further content;
    obtaining user-side PDI information;

determining whether the provider-side PDI information and the user-side PDI information match;

storing the further content when the provider-side PDI information and the user-side PDI information are determined to match, including calling at least one application programming interface (API); and reproducing the further content on a display.

18. The information processing device according to claim 1, wherein the circuitry is configured to display an interface on the display to obtain the user-side PDI information.

19. The information processing device according to claim 1, wherein the provider-side PDI information is included in the broadcast signal.

* * * * *